(12) United States Patent
Graefe et al.

(10) Patent No.: US 9,626,398 B2
(45) Date of Patent: Apr. 18, 2017

(54) TREE DATA STRUCTURE

(75) Inventors: Goetz Graefe, Madison, WI (US);
Harumi Kuno, Cupertino, CA (US);
Hideaki Kimura, Providence, RI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 948 days.

(21) Appl. No.: 13/477,789

(22) Filed: May 22, 2012

(65) Prior Publication Data
US 2013/0318126 A1 Nov. 28, 2013

(51) Int. Cl.
*G06F 17/30* (2006.01)

(52) U.S. Cl.
CPC .............. *G06F 17/30327* (2013.01)

(58) Field of Classification Search
CPC ................................. G06F 17/30327
USPC ....... 707/791, 793, 797, 798, 803, 812, 829, 707/830
See application file for complete search history.

(56) References Cited

U.S. PATENT DOCUMENTS

| | | |
|---|---|---|
| 5,430,869 A | 7/1995 | Ishak et al. |
| 6,792,432 B1 | 9/2004 | Kodavalla et al. |
| 7,383,276 B2 | 6/2008 | Lomet |
| 7,827,219 B2 | 11/2010 | Chowdhury |

OTHER PUBLICATIONS

Zhang, Donghui et al.; "B+-Tree"; 2009; pp. 197-300; Springer Science + Business Media LLC; https://www.cs.indiana.edu/~yuqwu/DBgroup/papers/2009-EODS-BP-Complete.pdf.
Lim, Sungchae et al.; "Restructuring the Concurrent B+-tree with non-blocked search operations"; Information Sciences; Nov. 2002; pp. 123-142; vol. 147; Issue 1-4.

*Primary Examiner* — Jean B Fleurantin
(74) *Attorney, Agent, or Firm* — Fabian VanCott

(57) ABSTRACT

A method of implementing a tree data structure comprises creating a parent and child relationship between a first node and a second node, in which the first node and second node are at the same hierarchical level of the tree data structure, and maintaining only one incoming pointer for each of the nodes in the tree data structure at all times. A tree data structure in which each node in the tree data structure has a single incoming pointer, and in which the tree data structure comprises a pointer directed to a local overflow node from a node at the same hierarchical level as the local overflow node.

20 Claims, 20 Drawing Sheets

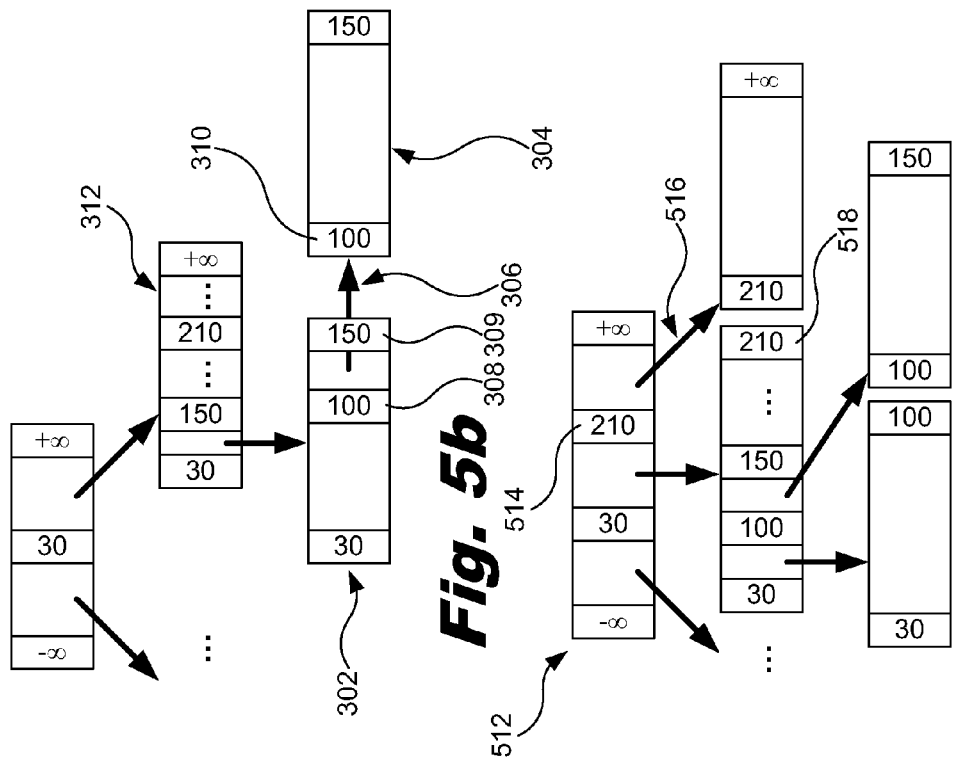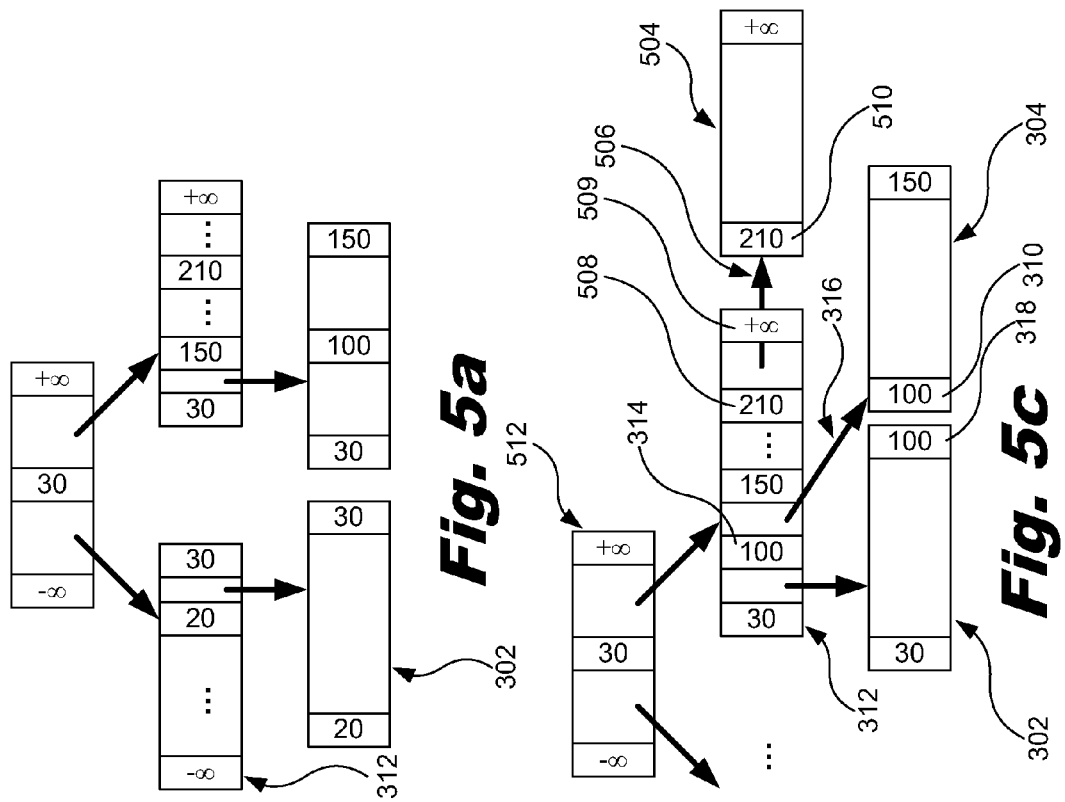

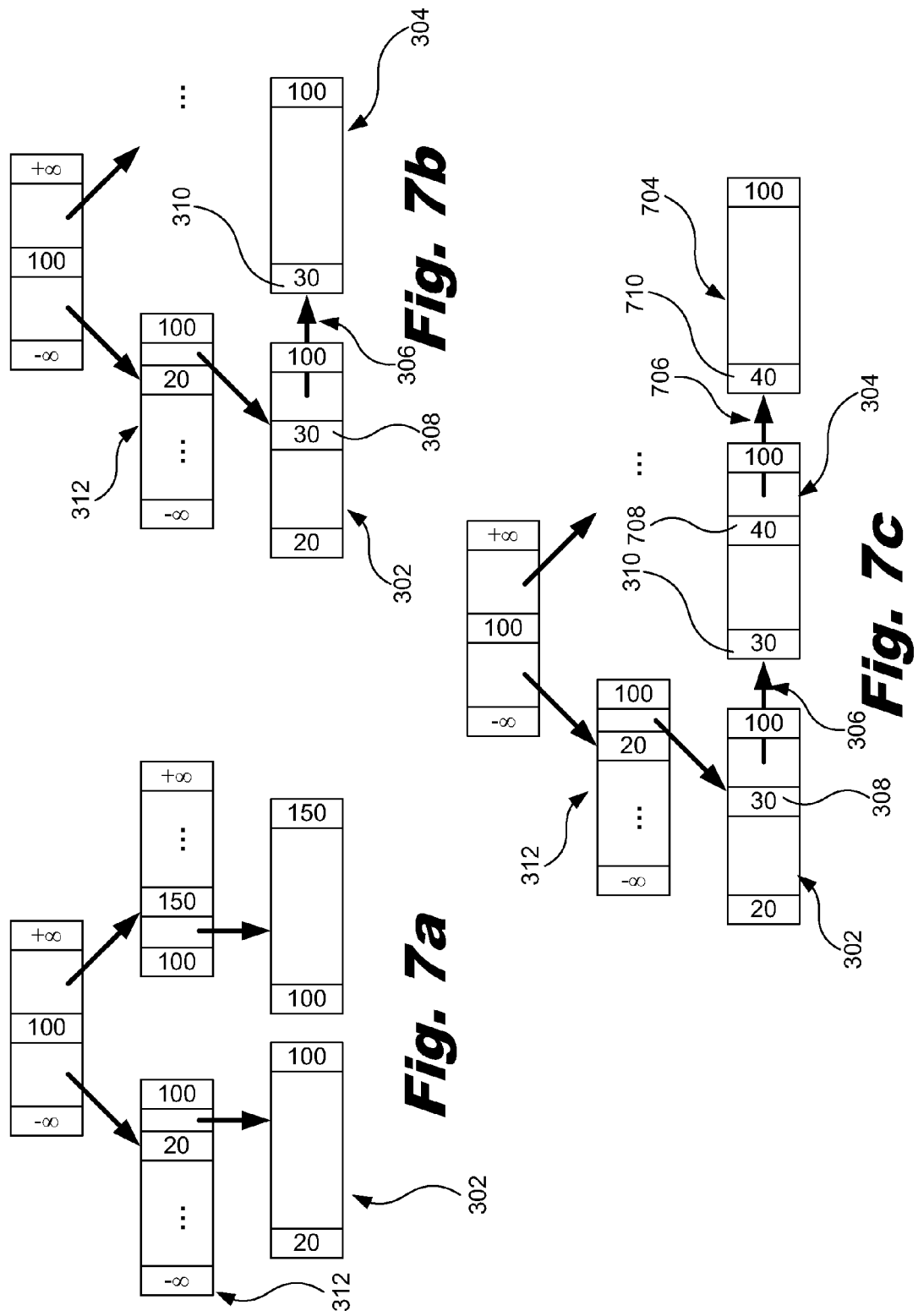

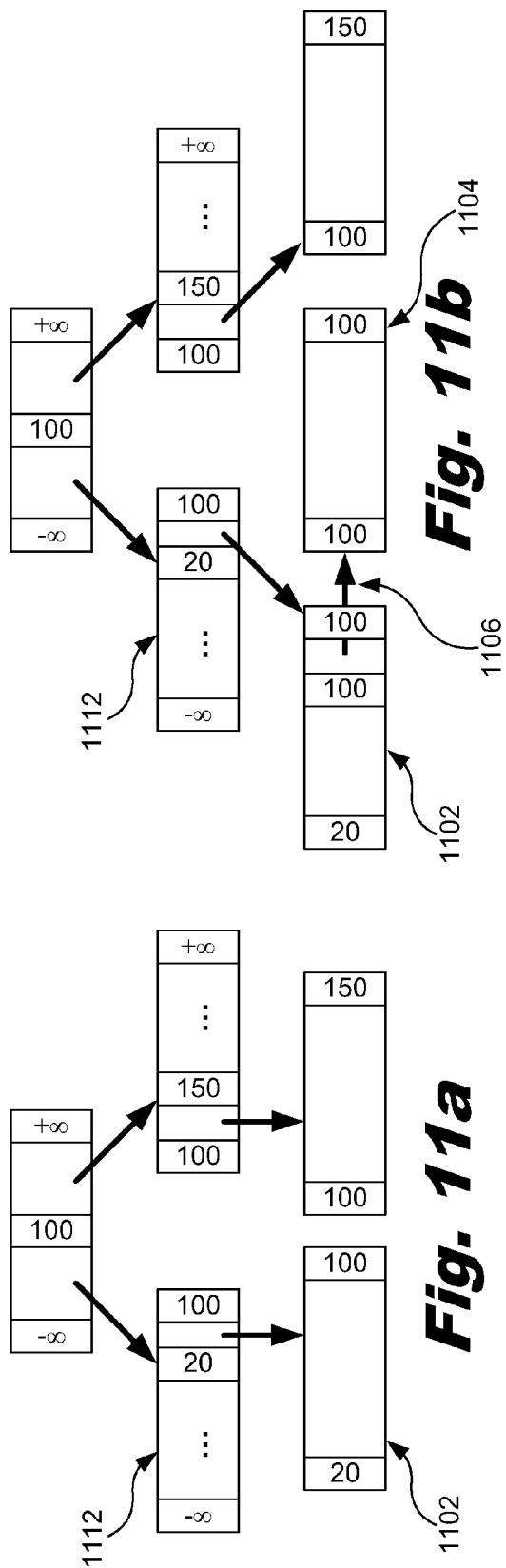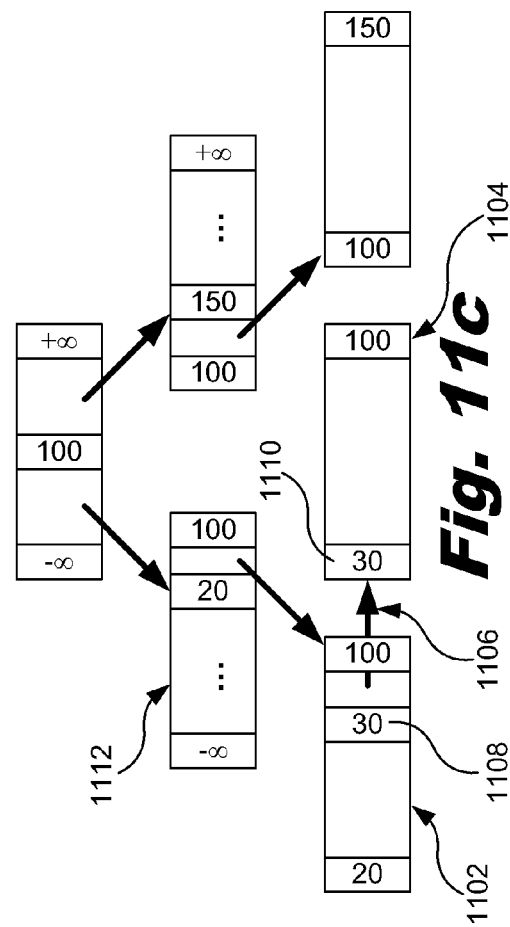
Fig. 11a
Fig. 11b
Fig. 11c

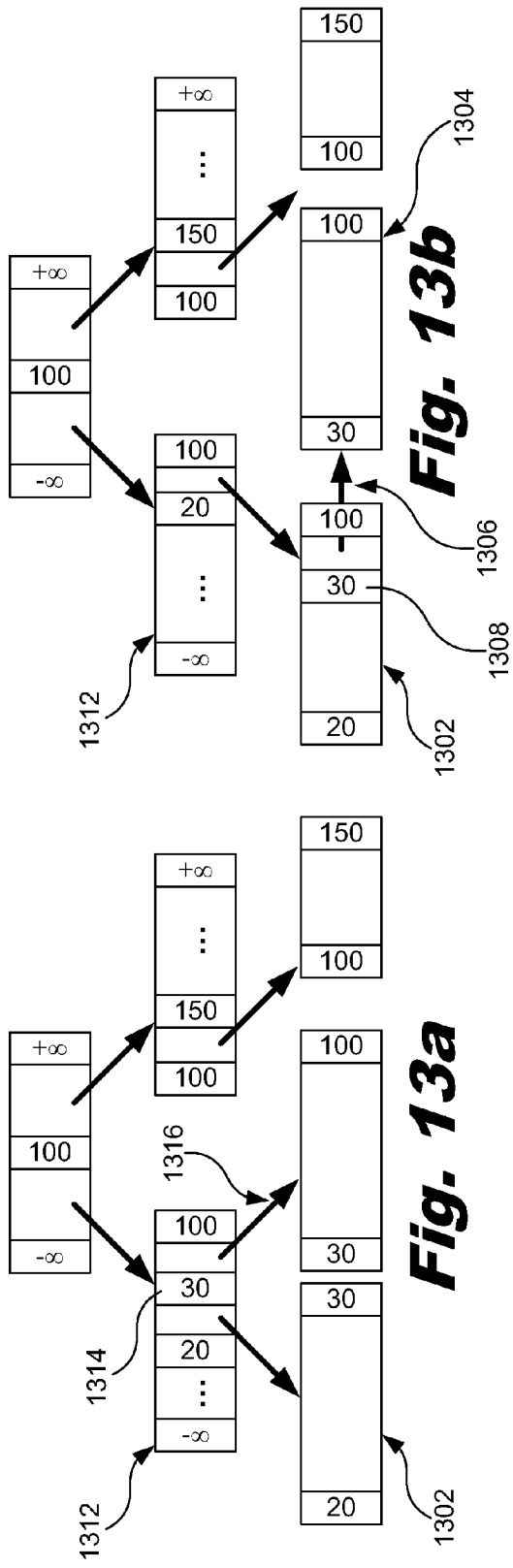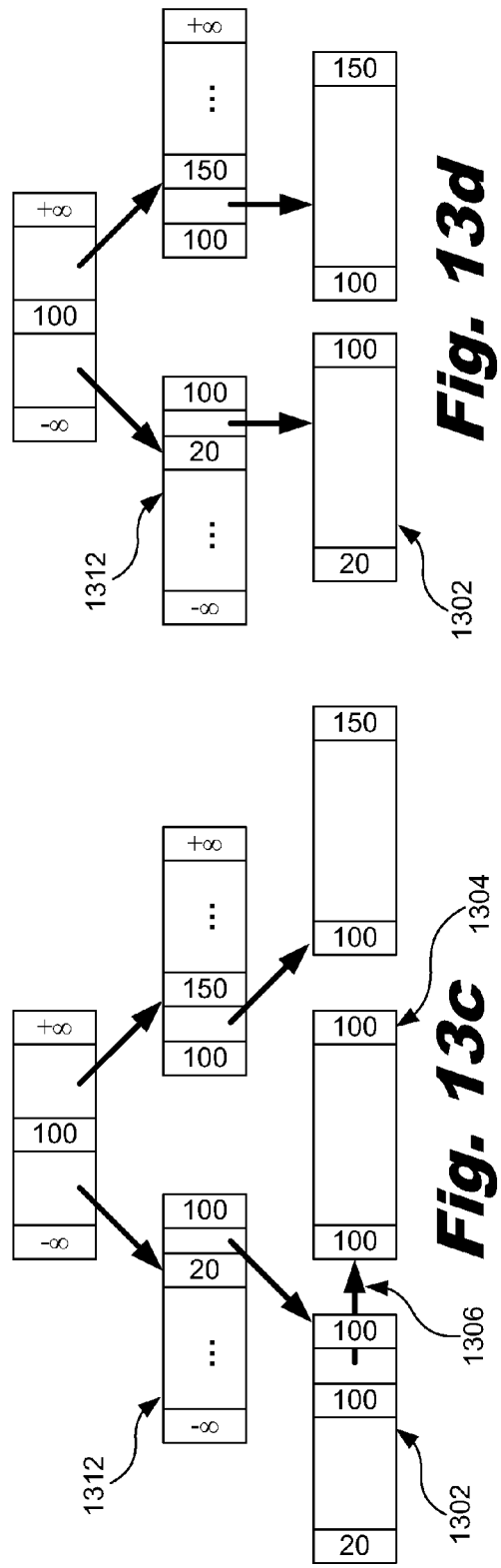

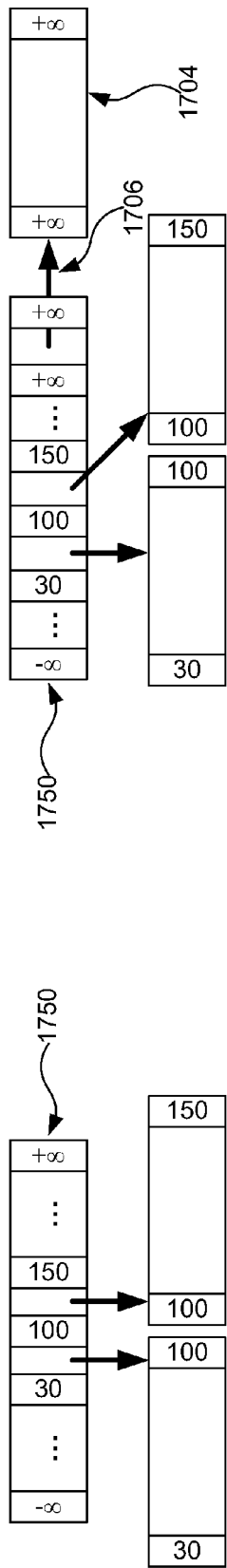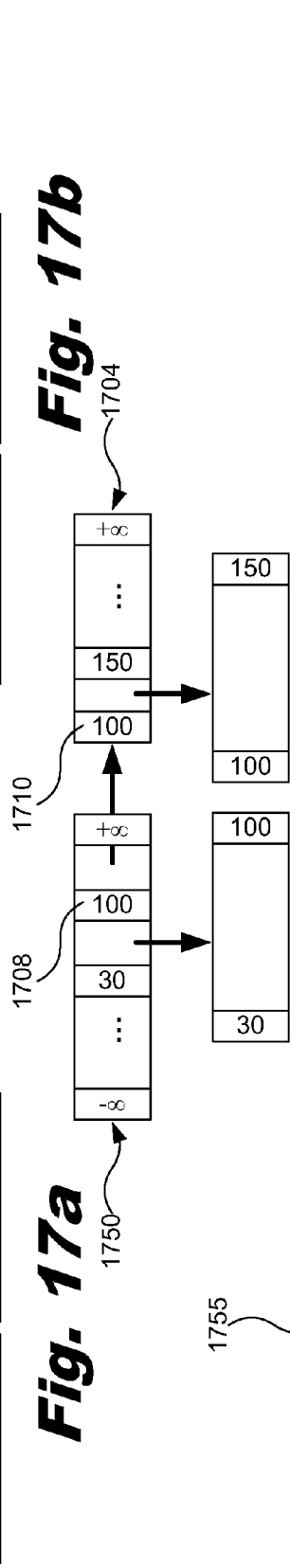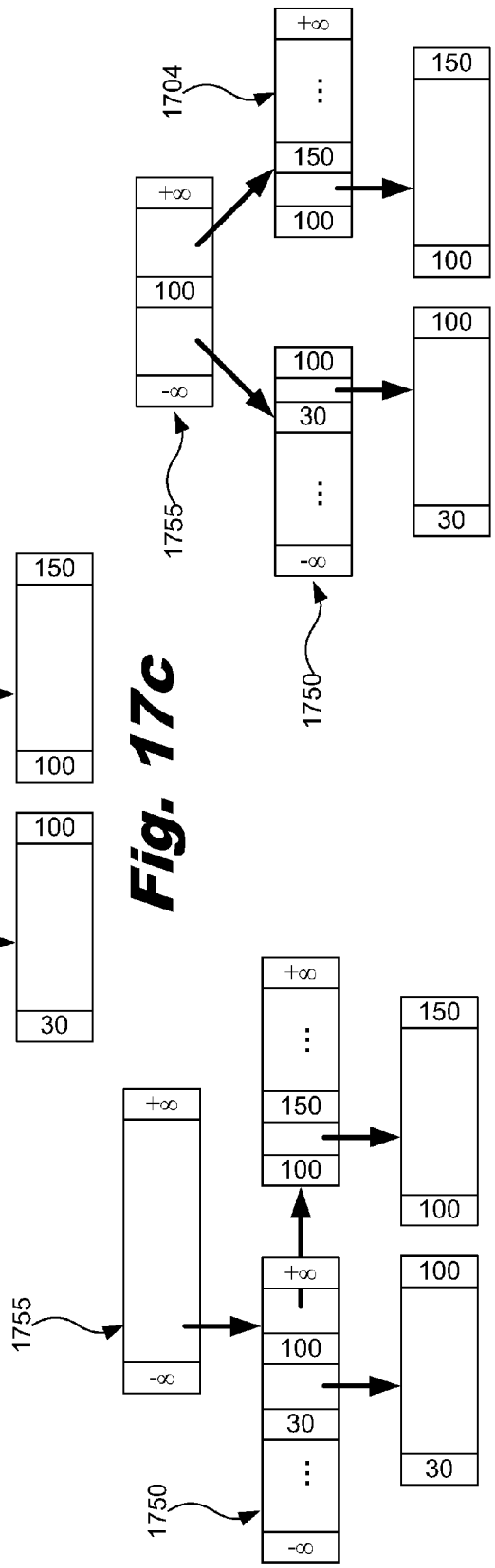

TREE DATA STRUCTURE

BACKGROUND

Tree data structures are used in databases and file systems to keep data sorted and allow for searches, sequential accesses, insertions, and deletions of data within a series of records. Various forms of tree data structures provide a number of benefits that make accessing and storing data in databases more efficient and less costly in time and capital.

BRIEF DESCRIPTION OF THE DRAWINGS

The accompanying drawings illustrate various examples of the principles described herein and are a part of the specification. The illustrated examples are given merely for illustration, and do not limit the scope of the claims.

FIGS. 5a through 5d are block diagrams of the various states of a Foster B-tree data structure during a node split propagation operation, according to one example of the principles described herein.

FIGS. 7a through 7d are block diagrams of the various states of a Foster B-tree data structure during a node split operation performed on a foster child node, according to one example of the principles described herein.

FIGS. 11a through 11c are block diagrams of the various states of a Foster B-tree data structure during a load node allocation operation, according to one example of the principles described herein.

FIGS. 13a through 13d are block diagrams of the various states of a Foster B-tree data structure during a leaf node deletion operation, according to one example of the principles described herein.

FIGS. 17a through 17e are block diagrams of the various states of a Foster B-tree data structure during a tree growth operation, according to one example of the principles described herein.

Throughout the drawings, identical reference numbers designate similar, but not necessarily identical, elements.

DETAILED DESCRIPTION

Figure 1:
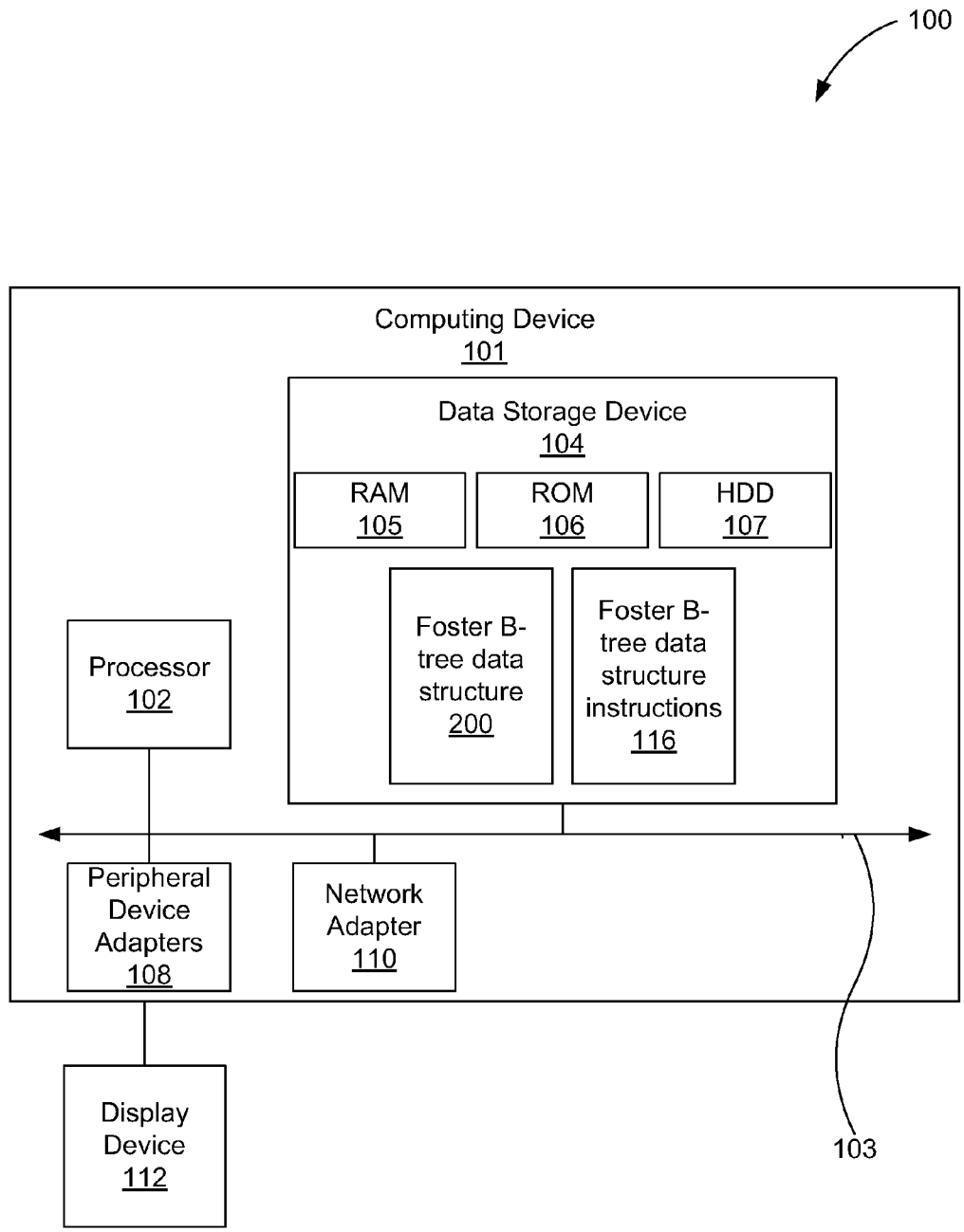
FIG. 1 is a diagram of a system for indexing data using a Foster B-tree data structure, according to one example of the principles described herein.

The present specification discloses a B-tree data structure called a Foster B-tree data structure. B-tree data structures are used in data management systems, in file systems, in transaction processing, in data warehousing, and in key-value stores. B-tree data structures are node-based tree data structures that keep data sorted and allow searches, sequential access, insertions, and deletions within databases of computing devices. A B-tree comprises a tree of nodes arranged in a series of parent-child relationships. Because the parent/child relationship is tightly-coupled, structural changes to child nodes require locking or latching parent nodes. For example, when child nodes are split or merged, the appropriate parent node is updated to reflect that change. The present Foster B-tree data structure is optimized to enable high concurrency and in-memory access. Foster B-tree data structures introduce a new type of relationship between nodes called a foster parent/foster child relationship. Nodes in the Foster B-tree data structure can create and dissolve foster parent/foster child relationships without parental involvement. Furthermore, a parent node can foster a child node to a sibling node, thereby delegating the effort required to perform expensive restructuring operations to the sibling and reducing contention for the parent node.

As new storage and indexing needs have emerged, variations of B-trees have evolved that meet special needs. For example, some columnar storage uses data structures very similar to B-trees such as, for example, data pages or leaf nodes with variable numbers of entries due to compression and pointer pages or branch nodes to permit fast navigation between columns based on row identifiers or record positions.

In the future, low-latency semiconductor storage may replace traditional disk drives as a dominant form of mass storage, largely reducing the impact of disk I/O as a data processing cost. Further, many-core processors will increase the concurrent utilization of in-memory.

The tFoster B-tree data structure described herein can support both operational line-of-business transaction processing and data warehousing, which implies primary and secondary (e.g., redundant) indexes, static and dynamic logical and physical schemas, small and large queries, small and large insertions and deletions including periodic and continuous bulk operations, compression including bitmap indexes, and storage formats from narrow (e.g., columnar) to very wide (e.g., master-detail clustering). In other words, the present Foster B-tree data structure does not exclude any data, access pattern, or hardware.

The present specification and drawings describe a method of implementing a tree data structure, according to an embodiment. The method uses a processor to create a parent and child relationship between a first node and a second node, in which the first node and second node are at the same hierarchical level of the tree data structure in the data tree structure. Only one incoming pointer for each of the nodes in the tree data structure is maintained at all times. Further, the parent and child relationship created between the first node and the second node does not involve a node in a higher hierarchical level of the tree data structure.

Foster B-tree data structures avoid sibling pointers because sibling pointers are expensive to update. Instead, each node within the Foster B-tree data structure has only one incoming pointer that references that node. Thus, if the node moves, for example, while being saved in a write-optimized store as appropriate for RAID devices or flash storage, only a single pointer requires maintenance.

This single "incoming" pointer per node can be a parent/child pointer. Foster B-tree data structures allow for one node to act as a temporary "foster" parent for another node at the same hierarchical level within the tree data structure. These nodes are referred to as "foster parent nodes" and "foster child nodes" in order to emphasize that the foster parent takes on sole authority with regard to navigation to the foster child, yet any horizontal pointer between nodes of the same level is temporary and neither permanent nor optimal. "Adoption" here means that a foster parent relinquishes control and the pointer and navigational responsibility is transferred up to the parent node of the foster parent node. Similarly, "fostering" here means that a parent node relinquishes control, and the pointer and navigational responsibility for a child node are transferred to the child node's left or right sibling, which then acts as the foster child node's foster parent node.

Concurrency control is the management of contention for data resources within a database. In database environments, two or more data access or modification processes can not be performed simultaneously or substantially simultaneously with regard to the same data. In order to ensure that multiple processes can share resources within the database at the same time, concurrency controls utilize locks and latches. A lock is used when multiple users access a database concurrently. In other words, a lock prevents one process from updating data that is being accessed by another process. A lock ensures the integrity of data by preventing concurrent users from accessing inconsistent data. Locks also prevent data from being corrupted or invalidated when multiple users try to write to the database. Any single process can only modify those database records to which they have applied a lock that gives them exclusive access. This state persists until the lock is released. Locking not only provides exclusivity to writes but also controls reading of unfinished modifications such as uncommitted data. Latches are short term locks that provide only exclusive access to protected data structures. A latch is applied to a number of nodes within a tree data structure to ensure that other processes do not modify the records contained within those nodes.

A thread is the smallest unit of processing that can be scheduled by an operating system. Multiple threads can exist within the same process and share resources such as memory. In one example, two or more threads may attempt to update the tree data structure at the same time and find it unexpectedly changing underfoot. To prevent this, locks and latches are used to protect data structures against concurrent access. Further, a page is a fixed-length contiguous block of virtual memory that is the smallest unit of data for memory allocation performed by the operating system for a program, and transfer between main memory and any other auxiliary store, such as a hard disk drive.

Foster B-tree data structures rely on latch coupling. Latch coupling is a method used within a tree data structure where a latch on a parent node is retained until the child node is latched. Foster B-tree data structures allow a thread to release its latch on a parent node only after acquisition of a latch on the child node. This applies to both "natural" parents and to "foster" parents. The step between siblings (i.e., from a foster parent to a foster child) is handled precisely like the step from a natural parent to a child.

Database pages, records, and other data structures can be corrupted for a number of reasons, including hardware failures and software failures. The consistency check utilized throughout the Foster B-tree data structure determines whether the fence keys within a particular node are those key values to the left and right of the pointer that points from the parent node of that particular node. In this manner, the Foster B-tree data structure checks itself to determine whether or not the nodes within the Foster B-tree data structure are appropriately structured. In this manner, Foster B-tree data structures enable both local, incremental verification of data within the Foster B-tree data structure as well as global verification of a single B-tree or of multiple B-trees via this consistency check process. Even disk-order scans which scan pages within the database in order of the pages stored on the disk tolerate foster relationships including pointers among neighbors on the same hierarchical level, in addition to parent-to-child pointers.

As used in the present specification and in the appended claims, the term "tree data structure" or similar language is meant to be understood broadly as any hierarchical tree structure within a data storage architecture of a data storage device. The tree data structure comprises a set of linked nodes, where each node comprises data. In one example, the tree data structure stores data within the nodes in a sorted order to allow for quick look-up of portions of data within the data storage device.

As used in the present specification and in the appended claims, the term "parent node" is meant to be understood broadly as any node that has a child node. Any given node has at most one parent node. Further, as used in the present specification and in the appended claims, the term "child node" is meant to be understood broadly as any node that is relatively lower than another node within a tree data structure. In this manner, a parent node and a child node form a parent/child relationship when that child node depends from the parent node.

As used in the present specification and in the appended claims, the term "pointer" is meant to be understood broadly as any identifier that identifies the existence of a series of records within a relatively lower node in a tree data structure hierarchy than the node from which the pointer originates. Thus, a pointer points from a parent node to a child node. Further, as used in the present specification and in the appended claims, the term "key" is meant to be understood broadly as any value that represents an indexed data set within a series or collection of data sets. For example, a key whose value is "100" marks the 100th record within a node that is indexed or order based on key values. Still further, as used in the present specification and in the appended claims, the term "fence key" is meant to be understood broadly as any key that delimits the range of key values within a node. In one example, a node may comprise two fence keys. In this example, one of the fence keys is a low fence key that marks the lowest possible key value within that node, and the other fence key is a high fence key that marks the highest possible key value within that node.

As used in the present specification and in the appended claims, the term "root node" is meant to be understood broadly as the highest level node within a tree data structure. The root node is the highest node within the tree data structure, and has no parent node. The root node comprises a number of separator keys that guide a search to relatively lower hierarchical nodes. Further, as used in the present specification and in the appended claims, the term "branch node" is meant to be understood broadly as any node of a tree data structure that has a number of child nodes, but is not the root node. Still further, as used in the present specification and in the appended claims, the term "leaf node" is meant to be understood broadly as any node of a tree data structure that does not have a child node.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

FIG. 1 is a diagram of a system (100) for indexing data using a Foster B-tree data structure, according to one example of the principles described herein. To achieve its desired functionality, the computing device (101) comprises various hardware components. These hardware components may include, for example, a processor (102), a data storage device (104), a network adaptor (110), and peripheral device adapters (108), among others. These hardware components may be interconnected through the use of a number of busses and/or network connections. In one example, the processor (102), data storage device (104), network adaptor (110), and peripheral device adapters (108) are communicatively coupled via bus (103).

The processor (102) may include the hardware architecture for retrieving executable code from the data storage device (104) and executing the executable code. The executable code, when executed by the processor (102), causes the processor (102) to implement at least the functionality of data indexing and management such as, for example, data indexing, node splitting, node split propagation, node chaining, load balancing within nodes, node deletion, node allocation, foster B-tree growth, assigning of keys, and assigning of pointers, among other processes. In the course of executing code, the processor (102) may receive input from and provide output to a number of the remaining hardware units. In one example, the computing device (101) may further comprise a display device (112) for displaying user interactive text and images so that a user can instruct the computing device (101) to perform at least the above functionality of the processor (102).

The data storage device (104) of the computing device (101), may store data such as executable code. This executable code is processed and produced by the processor (102). The data storage device (104) may include various types of memory devices, including volatile and nonvolatile memory. For example, the data storage device (104) of the present example may include Random Access Memory (RAM) (105), Read Only Memory (ROM) (106), and Hard Disk Drive (HDD) memory (107), among others. The present specification contemplates the use of many varying type(s) of memory in the data storage device (104) as may suit a particular application of the principles described herein. In certain examples, different types of memory in the data storage device (104) may be used for different data storage needs. In certain examples, the processor (102) may boot from the Read Only Memory (ROM) (106), maintain nonvolatile storage in the Hard Disk Drive (HDD) memory (107), and execute program code stored in Random Access Memory (RAM) (105). In one example, the Foster B-tree data structure of the present disclosure operates on one or more of the RAM (105), ROM (106), and HDD memory (107) of the data storage device (104). In another example, the Foster B-tree data structure of the present disclosure operates on a data storage device external to the computing device (101).

Generally, the data storage device (104) may comprise a computer readable storage medium. For example, the data storage device (104) may be, but not limited to, an electronic, magnetic, optical, electromagnetic, infrared, or semiconductor system, apparatus, or device, or any suitable combination of the foregoing. More specific examples of the computer readable storage medium may include, for example, the following: a portable computer diskette, a hard disk, a random access memory (RAM), a read-only memory (ROM), an erasable programmable read-only memory (EPROM), flash memory, byte-addressable non-volatile memory (phase change memory, memristors), a portable compact disc read-only memory (CD-ROM), an optical storage device, a magnetic storage device, or any suitable combination of the foregoing, among others. In the context of this document, a computer readable storage medium may be any tangible medium that can contain, or store a program for use by or in connection with an instruction execution system, apparatus, or device.

The data storage device (104) also comprises a Foster B-tree data structure (200) and a Foster B-tree data structure instructions (116) for implementing the Foster B-tree data structure (200) within the data storage device via the processor (102). The Foster B-tree data structure (200) and Foster B-tree data structure instructions (116) may be stored on the RAM (105), ROM (106), HDD (107), or combinations thereof. In one example, a portion of the Foster B-tree data structure (200) is stored in the RAM (105) and another portion is stored in ROM (106). In another example, the Foster B-tree data structure instructions (116) are stored in ROM (106). The Foster B-tree data structure (200) and Foster B-tree data structure instructions (116) provide for the implementation of the present Foster B-tree data structure (200) of FIG. 2.

The network adaptor (110) of the computing device (101) provides the computing device (101) with connectivity to a network. Thus, the computing device (101) is able to communicate to other computing devices via the network adaptor (110). The network adaptor (110) may employ a data link layer standard such as, for example, Ethernet or Wi-Fi, among others, in order to transfer data using wired communications, wireless communications, or a combination thereof.

The peripheral device adapter (108) of the computing device (101) enables the processor (102) of the computing device (101) to interface with various other hardware elements, external and internal to the computing device (101).

For example, the peripheral device adapter (108) may provide an interface to input/output devices, such as, for example, the display device (112), an external storage device, a keyboard, touch screen displays, and a mouse, among others, to create a user interface and/or access external sources of memory storage, for example.

The system (100) of the present application may be used in various different environments. The system may be used in environments where highly reliable, available, scalable, fast, and energy-efficient key-value stores are useful. For example, the system (100) may be used in server or cloud services and may complement these services with robust query execution techniques that encompass traditional join and aggregation methods as well as extensible map-reduce operations.

Figure 2:
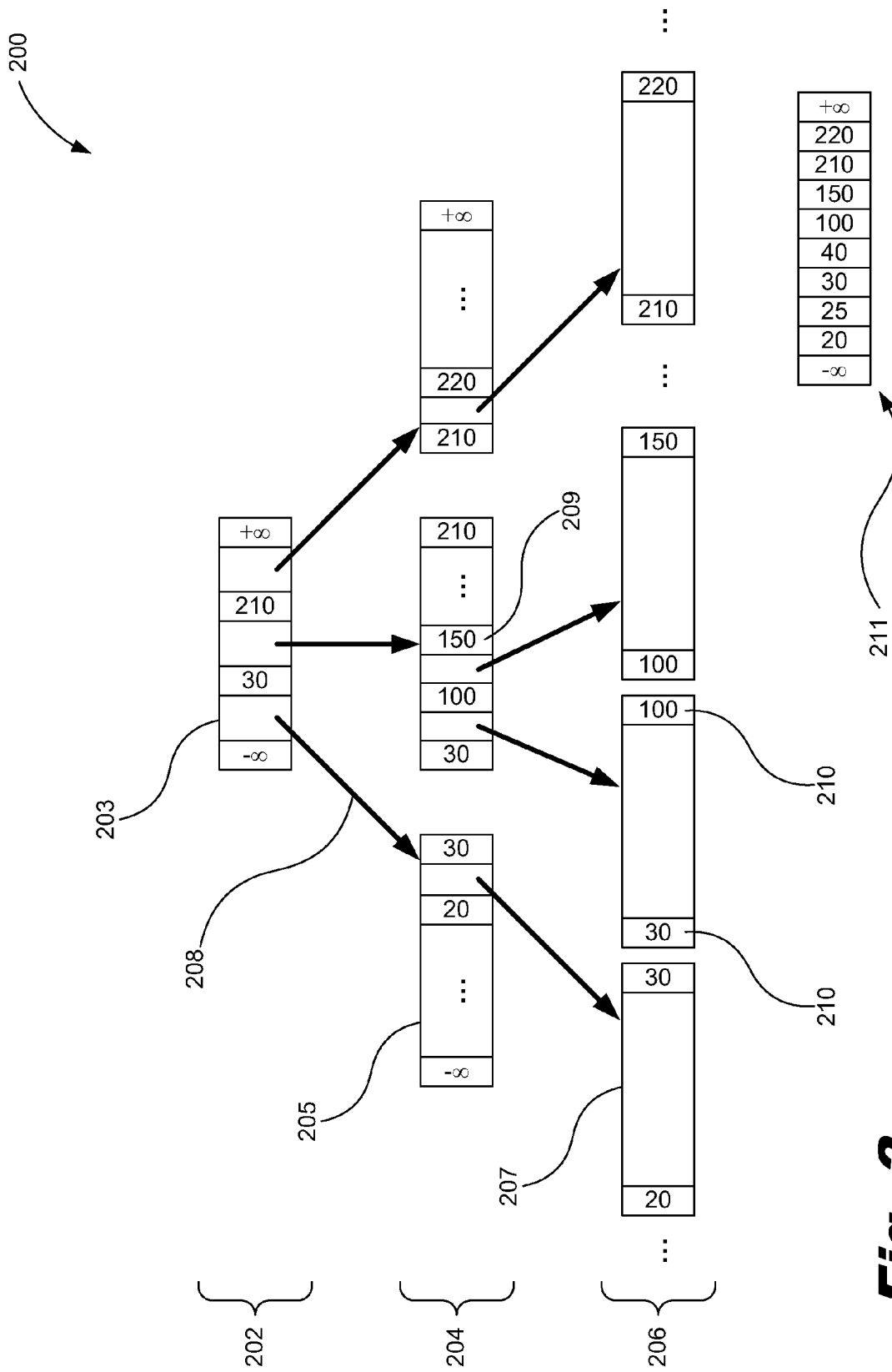
FIG. 2 is a block diagram of a Foster B-tree data structure, according to one example of the principles described herein.

Having described the various devices within the system (100) for data indexing and management, FIG. 2 is a block diagram of a Foster B-tree data structure (200), according to one example of the principles described herein. The Foster B-tree data structure (200) comprises a root node level (202) comprising a root node (203). The Foster B-tree data structure (200) also comprises a branch node level (204) comprising a number of branch nodes (205). A number of leaf nodes (207) are included in a leaf node level (206) of the Foster B-tree data structure (200). Each node within the Foster B-tree data structure (200) except for the root node (203) has a pointer (208) pointing to it. Thus, the root node (203) comprises pointers (208) that point to the branch nodes (205), and the branch nodes (207) comprise pointers (208) that point to leaf nodes (207) or other branch nodes (205) in the case where there is more than one branch node level (204). In this manner, the pointers (208) are parent-child pointers where the pointers (208) point from a parent node in a relatively higher hierarchy level of the Foster B-tree data structure (200) to a node in a relatively lower hierarchy level of the Foster B-tree data structure (200). FIG. 2 depicts a Foster B-tree data structure (200) in a steady state where no processes are being run by the processor (102) in connection with the Foster B-tree data structure (200) within the data storage device (104).

The example of FIG. 2 depicts one branch node level for the sake of clarity. However, a Foster B-tree data structure (200) may include a number of branch node levels (204) and, thus, more than three levels total. In another example, a Foster B-tree data structure (200) may comprise less than three levels. In this example, the Foster B-tree data structure (200) comprises a root node (203) and a number of leaf nodes (207). In still another example, the Foster B-tree data structure (200) may comprise a single node, where the single node is both a root node (203) and a leaf node (207).

FIG. 2 also depicts a number of keys (209, 210) within the nodes (203, 205, 207). The keys (209, 210) comprise a number of separator keys (209). The separator keys (209) guide searches by separating records within that node, or separating pointers (208) that point to child nodes in a lower hierarchical level of the Foster B-tree data structure (200). The keys (209, 210) also comprise a pair of fence keys (209) with values equal to separator keys posted in the parent node (i.e., the root node (203) or a branch node (205)). Both leaf (207) and branch (205) nodes each carry low and high fence keys (209) defining that node's possible key range. Fence keys simplify or speed up defragmentation, key range locking at page boundaries, prefix truncation (compression), and verification of B-tree integrity, specifically in connection with cross-checking cousin nodes.

The root node (203), as depicted in FIG. 2, carries low and high fence keys (210) of $-\infty$ and $+\infty$. This indicates that any number of records may be included in the data storage device (104) and that the number of records, overall, are unbounded. The fence keys in the root node (203) are the boundaries of the key domain. By default, they are $\pm\infty$. By convention, $-\infty$ may be equivalent to a null value, but that does not work well if the Foster B-tree key comprises multiple individual fields, each of which may be null independently of the other fields. In other words, the key domain of the Foster B-tree data structure (200) may differ from the key domain(s) of the indexed attribute(s). This is true in particular, if key values in the Foster B-tree data structure (200) are prefixed by structural information.

A root node may contain a number of separator keys that guide a search towards leaf nodes. The relationship between leaf nodes that are neighbors but not siblings under the same parent node is called a cousin node relationship. This is because these leaf nodes share a grandparent node. With fence keys, all consistency checks between nodes, including between cousins and even second cousins in deeper tree data structures can be verified as a side effect of repeated root-to-leaf search operations.

The root node (203) also comprises a number of separator keys (209). In the example of FIG. 2, the separator keys (209) within the root node (203) are indicated as "30" and "210." The left-most branch node (205) comprises the unbounded low fence key (210) of $-\infty$ and a high fence key of "30." Further, the left-most leaf node (207) comprises a low fence key of "20" and a high fence key (210) of "30." As further depicted in the example of FIG. 2, the middle branch node (205) comprises low and high fence keys (210) of "30" and "210," as well as separator keys (209) of "100" and "150." Thus, the leaf nodes (207) to which the pointers (208) of the middle branch node (205) point to are bounded by the keys "30" and "100," and "100" and "150," respectively. In this manner, child nodes within a Foster B-tree data structure (200) comprise fence keys (210) that are separator keys (209) posted in the parent node.

For local verification as a side effect of query processing and other root-to-leaf passes, key values are carried from a parent node to a child node. The key values immediately next to the child pointer within the parent must be equal to the fence keys in the child node. If there is a difference, the internal structural consistency of the tree data structure has been compromised.

No memory is needed from one root-to-leaf search to another such that these search operations may occur at any time, in any thread, and in any transaction. With neighbor pointers that are realized as page identifiers, some form of memory is required across threads, and transactions in order to achieve comparable verification. Moreover, if the tree data structure changes, this memory must be maintained correctly in addition to the tree data structure itself.

A single incoming pointer to every tree node, as guaranteed by the Foster B-tree data structure, enables efficient verification of a tree in many contexts. In addition to incremental verification during queries and updates, they permit efficient verification of pages obtained from a disk-order scan or contained in a linearized backup or replication stream. In all cases, the verification can be exhaustive such that all invariants are tested.

FIG. 2 also depicts a key chart (211) indicating the sort order of the records within the Foster B-tree data structure (200) within the data storage device (104). The key values listed in the key chart (211) between $-\infty$ and $+\infty$ are examples, and any number of values may be included, and these values may be any key value. The key chart (211) of FIG. 2 will be used throughout all the drawings as indicating the sort order of the records within the Foster B-tree data structure (200).

To find a record stored with a particular key value within the data storage device (104), a search may be performed utilizing the Foster B-tree data structure (200). The search moves through the Foster B-tree data structure (200), starting at the root node (203), and comparing key values stored at each node visited with the key value sought. The results of each comparison operation, in conjunction with the pointers (208) stored with each node, indicate which path to take through the Foster B-tree data structure (200) to reach the record ultimately desired. Ultimately, a search may end at a particular leaf node (207) which may, in turn, point to (i.e., store a pointer to or identifier for) a particular data record for the key value sought. In one example, the leaf nodes (207) are within a clustered index, and store the actual data of the data records on the leaf nodes (207) themselves. In another example, a number of records may be stored in a number of higher level nodes.

As will be described in more detail below, a Foster B-tree data structure (200) has a number of qualities and parameters. A Foster B-tree data structure (200) can split nodes locally without immediate upward propagation or involvement of a parent node. Further, during an operation performed on within the data structure only two latches are required at a time; one latch for a foster child node, and another latch for the foster parent node.

Further, a Foster B-tree data structure (200) permits only a single incoming pointer per node at all times. In this manner; Foster B-tree data structure (200) support efficient page migration and defragmentation. Further, the restriction to a single incoming pointer per node at all times within a Foster B-tree data structure (200) enables very simple and efficient node deletion. As during node insertion, two local latches also suffice during node deletion, and load balancing, among other operations.

Still further, due to its symmetric fence keys, Foster B-tree data structures (200) permit continuous self-testing of all invariants. A Foster B-tree data structure (200) ensures that each node in the tree contains a pair of fence keys. Due to this quality, Foster B-tree data structure (200) enables very early detection of page corruption.

Even still further, Foster B-tree data structures (200) permit the creation of a number of parent and child relationships between nodes that are located at the same hierarchical level of the Foster B-tree data structure (200). In this example, a foster parent/foster child relationship is formed between the two nodes. The first node is the foster parent node, and the second node is the foster child node of the foster parent node. This relationship within the Foster B-tree data structure (200) may be maintained for some time, or may be temporary in nature. The creation of foster parent/foster child relationship does not involve a node in a higher hierarchical level of the Foster B-tree data structure. In this example, the foster parent node copies a separator key from its parent. Further, in one example, the foster parent node comprises three keys. Two of the keys are fence keys that match the fence keys of that foster parent node's parent. The third key is the separator key that is copied from that foster parent node's parent. The separator key that is copied from the foster parent node's parent matches a low fence key of the foster child node.

The processes performed within a data storage device (104) utilizing a Foster B-tree data structure (200) combine multi-step structural updates and system transactions. In this manner, user transactions update existing structures and system transactions allocate, create, reorganize, delete, and free structures such as pages and records.

The design of a Foster B-tree data structure (200) is a strict separation of logical database contents and physical database representation. User transactions read and modify logical database contents, which are protected by locks held until the end of a user transaction. The physical representation of database contents is protected by latches held only during a critical section. Latches coordinate threads accessing any in-memory data structures, including images of disk pages in the buffer pool. In one example, there may be a one-to-one relationship between transactions and threads.

Figure 3:
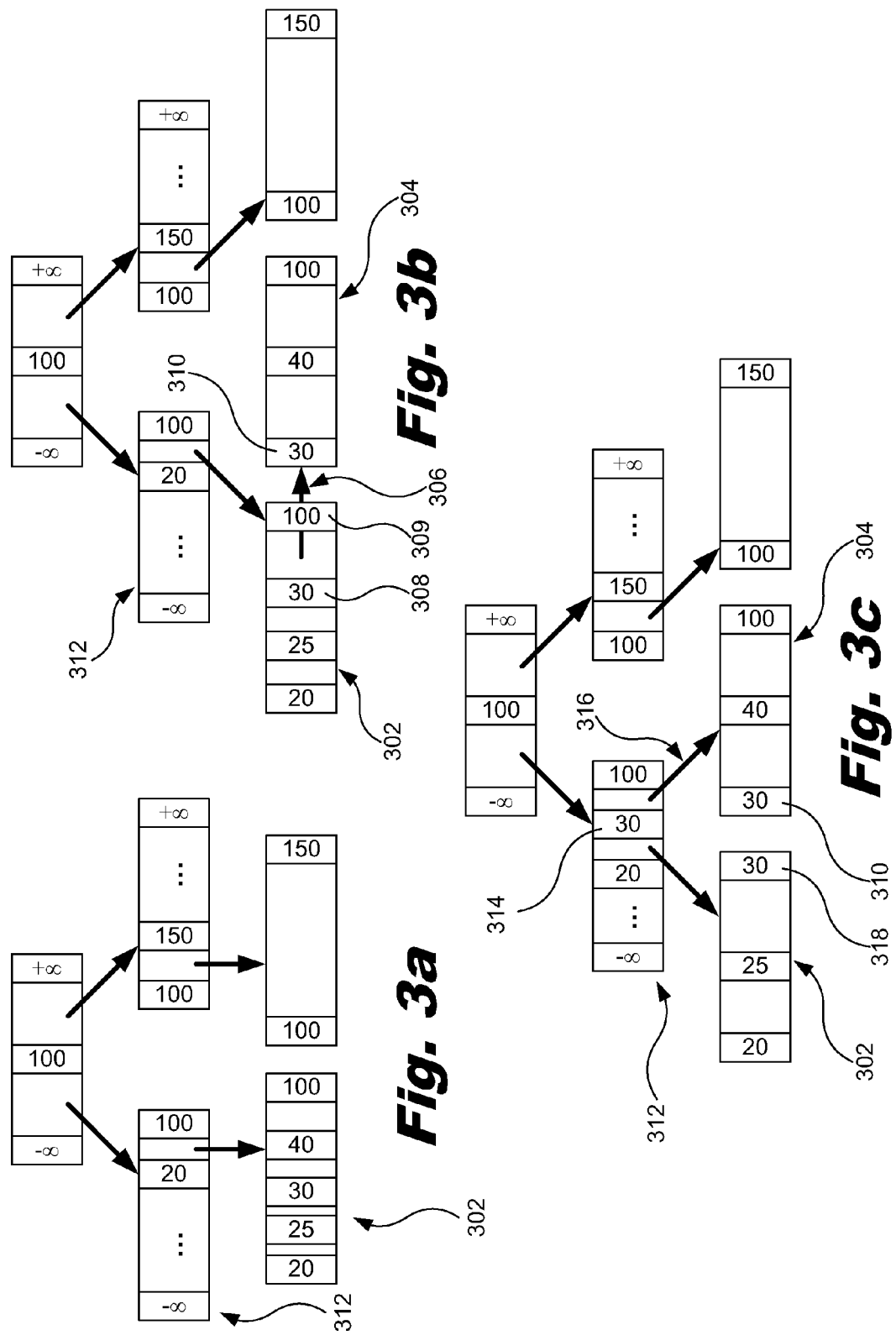
FIGS. 3a through 3c are block diagrams of the various states of a Foster B-tree data structure during a node split operation, according to one example of the principles described herein.
Figure 4:
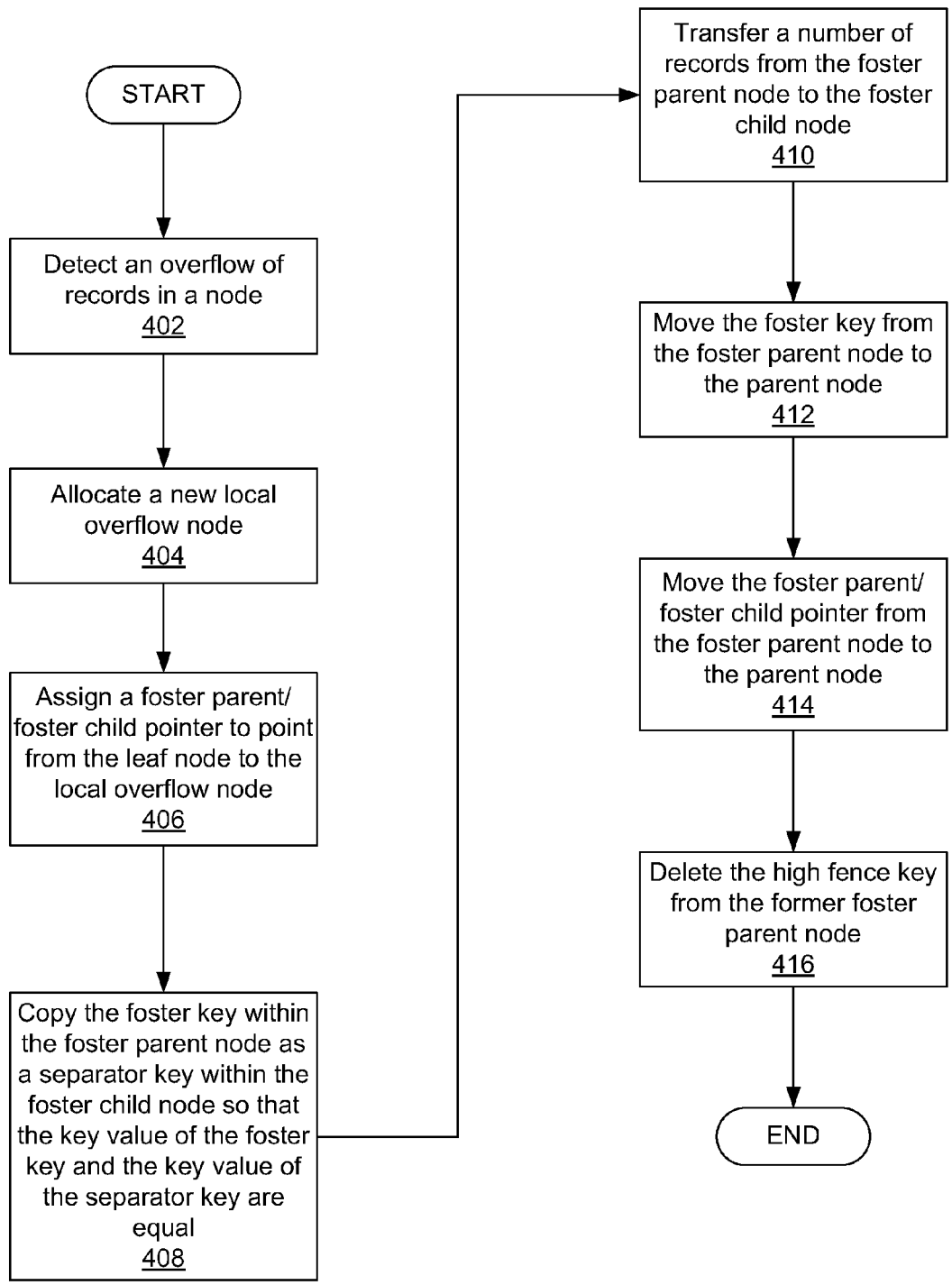
FIG. 4 is a flow chart depicting a split operation within a Foster B-tree data structure, according to one example of the principles described herein.

To follow are several processes that may be performed within the data storage device (104) utilization the Foster B-tree data structure (200). These processes include writing additional data to the data storage device (104), deleting data from the data storage device (104), and migrating a number of portions of data from one area of the data storage device (104) to another, or rearranging the indexing of data within the data storage device (104). FIGS. 3a through 3c are block diagrams of the various states of a Foster B-tree data structure (200) during a node split operation, according to one example of the principles described herein. FIG. 4 is a flow chart depicting a split operation within a Foster B-tree data structure (200), according to one example of the principles described herein.

Often, a node within a Foster B-tree data structure (200) may be populated with too many records that would exceed the size of the node above a threshold or otherwise make a search for data within the node take relatively more time than desired. In this situation, the Foster B-tree data structure (200) splits the node to create two or more nodes. These two nodes may, in one example, generally split the number of records in half, and allocate half of the records to one node and the other half of the records to the other node. An example of this node split operation is depicted in FIGS. 3A through 3C and FIG. 4. The method of FIG. 4 begins with the processor (102) detecting (FIG. 4, block 402) an overflow of records in a node. In one example, the detection (FIG. 4, block 402) may be a detection of more records being added to the node above a threshold. In this example, the threshold may be above, below, or equal to a maximum number of records that may fit in that node. In the example of FIG. 3a, leaf node (302) is experiencing a surplus or overflow of records.

Once detected (FIG. 4, block 402), the processor (102) initiates a split of a leaf node (302), for example, by allocating (FIG. 4, block 404) a new local overflow node (304) within the Foster B-tree data structure (200). The processor (102) assigns (FIG. 4, block 406) a foster parent/foster child pointer (306) to point from the leaf node (302) to the local overflow node (304). In other words, the foster parent/foster child pointer (306) points from the leaf node (302) to the local overflow node (304) so that the keys from "30" to "100" are directed from the leaf node (302) to the local overflow node (304). In this manner, the leaf node (302) points to the local overflow node (304) located on the same hierarchical level as the leaf node (302), and the leaf node (302) becomes a foster parent node to the local overflow node (304), and the local overflow node (304) becomes a foster child node to the leaf node (302).

Further, FIG. 3b depicts a separator key called a foster key (308). The processor (102) copies (FIG. 4, block 408) the foster key (308) within the foster parent node (302) as a separator key (310) within the foster child node (304) so that the key value of the foster key (308) and the key value of the separator key (310) are equal. In this manner, the foster key (308) acts as a separator key that determines which key values belong to the foster parent node (302) and which key values belong to the foster child node (304). In one example such as the example of FIG. 3b, the separator key (310) is a flow fence key. In another example where fence keys are not utilized within the nodes of the Foster B-tree data structure (200), separator key (310) is a non-fence key. In still another example where fence keys are not utilized within the nodes of the Foster B-tree data structure (200), no separator keys (310) are used within the foster child node (304).

The processor (102) transfers (FIG. 4, block 410) a number of records contained within the foster parent node (302) to the foster child node (304). In the example of FIGS. 3a through 3c, the keys between "20" and "30" remain within the foster parent node (302), and the keys between "30" and "100" are transferred to the foster child node (304). In other words, in the example of FIG. 3b, the foster key (308) has a key value of "30." Thus, all records from "30" to "100" that were transferred to the foster child node (304) at block 410 of FIG. 4 comprise records with key values from "30" to "100."

The Foster B-tree data structure (200) may remain in the state depicted in FIG. 3b for any length of time. For example, the Foster B-tree data structure (200) may remain in the state depicted in FIG. 3b temporarily. Thus, in drawing from a real-world analogy of a temporary child custody situation called a foster parent and foster child relationship, the leaf node (302) as a "foster parent node" functions as a temporary parent node to the local overflow node (304) which is the "foster child node."

To extend the real-world analogy, the Foster B-tree data structure (200) returns to a steady state through an "adoption." As depicted in FIG. 3c, an adoption of the foster child node (304) by the parent node (312) of the foster parent node (302) occurs. In order to adopt the foster child node (304), the processor (102) moves (FIG. 4, block 412) the foster key (308) of the foster parent node (302) to the parent node (312). In this manner, a new separator key (314) within the parent node (312) is created that equals the value of the foster key (308).

Further, the processor (102) moves (FIG. 4, block 414) the foster parent/foster child pointer (306) of FIG. 3b from the foster parent node (302) to the parent node (312) so that the pointer is now a parent/child pointer (316). This is achieved by moving the pointer (306) from the foster parent node (302) to the parent node (312) between the separator key (314) and the high fence key of the parent node (312). In the example of FIGS. 3b and 3c, the foster parent/foster child pointer (306) is moved from between keys "30" and "100" of the foster parent node (302) to between keys "30" and "100" of the parent node (312). In this manner, the foster child node (304) is adopted by the parent node (312).

The processor (102) deletes (FIG. 4, block 416) the high fence key (309) from the former foster parent node (302). In this manner, the former foster key (308) becomes the new high fence key (318) within the former foster parent node (302). In the example of FIG. 3c, the separator key (314) has a key value of "30," and matches the new high fence key (318) of the former foster parent node (302) and the low fence key (310) of the former foster child node (304). In this manner, the parent node (312) has separator key values of "20" and "30" and "30" and "100" to allow for records with key values between "20" and "30" to be directed to the former foster parent node (302) and records with key values between "30" and "100" to be directed to the former foster child node (304).

In this manner, a Foster B-tree data structure (200), in some examples, does not retain the foster parent/foster child pointer (306) to the foster child node (302). Instead, the foster parent/foster child pointer (306) is removed from the foster child node (302) when it is inserted into the parent node (312). Thus, the foster child pointer (304) is transferred up within the tree rather than duplicated. While it still retains the pointer to the new node (304), the formerly full node (302) acts as the temporary parent of the new node (304). Thus, these nodes are called "foster parent" and "foster child," their relationship a "foster relationship," and the entire B-tree data structure an "Foster B-tree." When a child node ceases to be a foster child of its foster parent and becomes a normal child node of its parent, the transfer of a pointer from a foster parent node to the parent node is called an "adoption."

In one example, the adoption happens as soon as easily possible after the node split. If there is no contention and an exclusive latch on the parent node is available, there may be no interval between the initial split of a node and the adoption. However, there is no disadvantage in delaying the adoption process.

In another example where the adoption process is delayed, deferred transfer of the foster child pointer (304) may lead to a chain of nodes. In this example, a foster child node of one node might also be the foster parent of another node as will be described in more detail below. Further, experimental analysis of chains of foster parent nodes and foster child nodes, it has been found that the performance effects of chains are minimal.

One property of a Foster B-tree data structure (200) is fence keys in each node. A node that is neither a foster parent node nor a foster child node carries a pair of fence keys; a low fence key and a high fence key. A foster child node also carries low and high fence keys. However, a foster parent node, due to its role as temporary parent of a sibling node, carries low and high fence keys as appropriate for its local key range plus a third key value for consistency checks. After a node split operation, but before adoption, the foster parent node holds key values defining the key range of the foster child node.

Database pages, records, and other data structures can be corrupted for a number of reasons, including hardware failures and software failures. For this reason, database software vendors may include verification utilities in their products under such names as "database analysis and reporting tool" or "inspect" produced and sold by International Business Machines Corporation; "dbverify" produced and sold by Oracle Corporation, "verifydb" produced and sold by Ingres Corporation; "check table" and "mysqlcheck" produced and sold by MySQL; and "database consistency check" produced and sold by Microsoft Corporation. Most vendors recommend running these utilities regularly, because they may find errors due to bad replication, snapshot software, and device drives, among others. The consistency check utilized throughout the Foster B-tree data structure (200) determines whether the fence keys within a particular node are those key values to the left and right of the pointer that points from the parent node of that particular node. In this manner, the Foster B-tree data structure (200) checks itself to determine whether or not the nodes within the Foster B-tree data structure (200) are appropriately structured.

Structural updates of a Foster B-tree data structure (200) are encapsulated with transaction semantics. However, these transactions are heavily optimized with respect to threading, concurrency control, logging, and commit processing. These optimizations exploit physical data independence, separation of logical database contents and physical representation, and multi-level transactions. Structural updates include, for example, transferring a pointer up (i.e., as in an adoption process) and down (i.e., as in a load balancing process), splitting a node, merging two nodes, load balancing between two nodes, and growing or shrinking the tree height, among others.

Each structural update made to a Foster B-tree data structure (200) is a transaction in its own right. With respect to transaction semantics, it is separate from the user transaction that gave rise to it, for example, an insertion of a record. Thus, the structural update might succeed and its effects persist even if the invoking user transaction fails. To distinguish a structural update from a transaction invoked by or for a user, a structural update is called a system transaction. A system transaction is limited to structural changes that do not change the logical contents of the database or the index.

Figure 6:
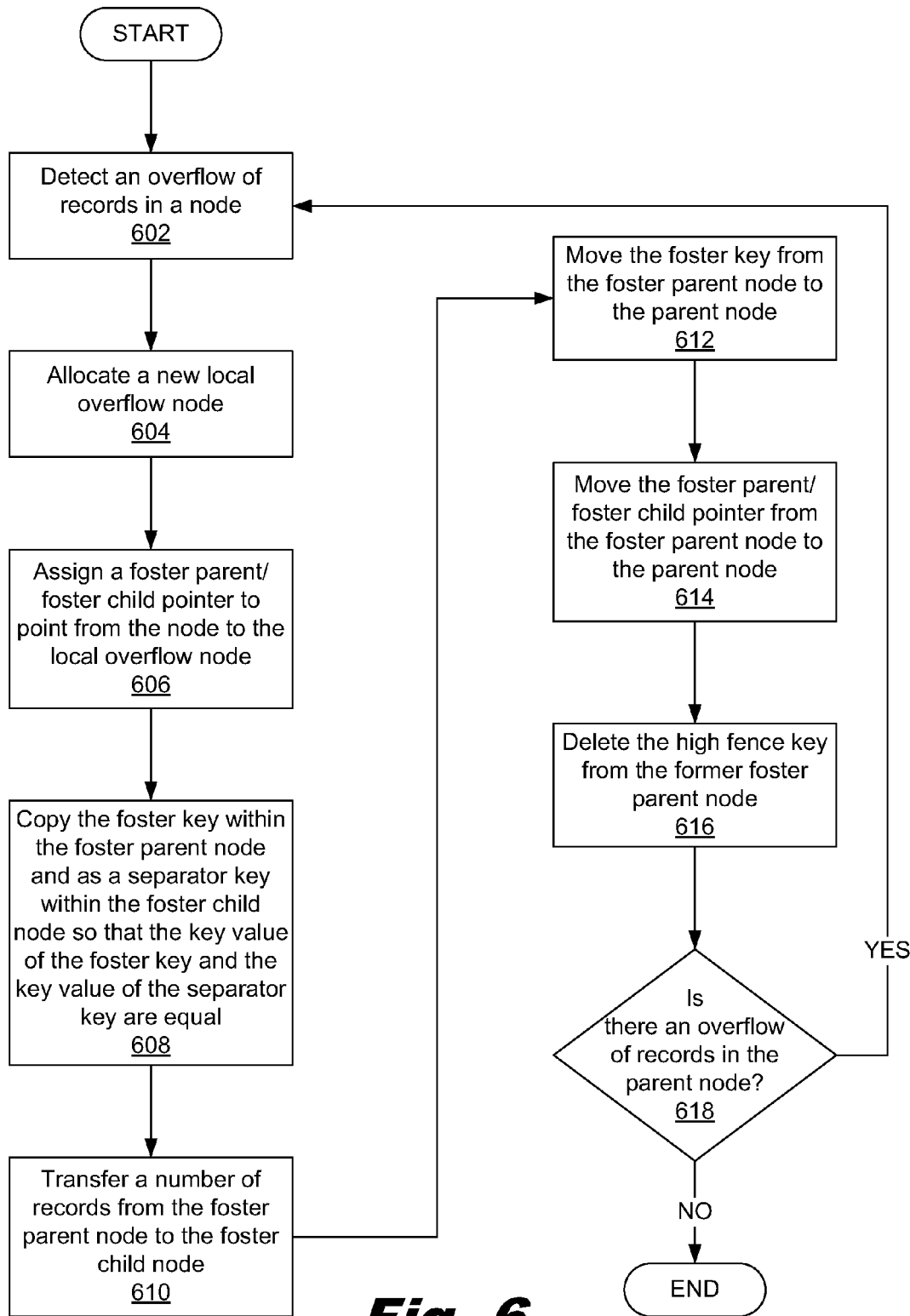
FIG. 6 is a flow chart depicting a split propagation operation within a Foster B-tree data structure, according to one example of the principles described herein.

FIGS. 5a through 5d are block diagrams of the various states of a Foster B-tree data structure (200) during a node split propagation operation, according to one example of the principles described herein. FIG. 6 is a flow chart depicting a split propagation operation within a Foster B-tree data structure (200), according to one example of the principles described herein. If, after splitting a leaf node (302) as demonstrated in FIGS. 3a through 3c and FIG. 4, the moving of separator key (314) and parent/child pointer (316) forces the parent node (312) to overflow, a new local overflow node is allocated. This new node is linked to the parent node (312) as a foster child node (504), and filled with some of the records from the overflowing parent node (312). Some time later, the appropriate separator key (514) and foster parent/foster child pointer (506) within the parent node (312) are moved to the parent of the parent node (512); that is the grandparent node of the leaf node (302) that had initially split. In this manner, ancestors up the Foster B-tree data structure (200) may split, repeating the same operations at each level. This process of node split propagation will now be described in more detail in connection with FIGS. 5a through 5d and FIG. 6.

The method of split propagation begins by splitting a leaf node (302) as described in connection with FIGS. 3a through 3c and FIG. 4. The processor (102) detects (FIG. 6, block 602) an overflow of records in a node such as leaf node (302) in FIG. 5a. Once detected (FIG. 6, block 602), the processor (102) initiates a split of the leaf node (302), for example, by allocating (FIG. 6, block 604) a new local overflow node (304) of FIG. 5b within the Foster B-tree data structure (200). The processor (102) assigns (FIG. 6, block 606) a foster parent/foster child pointer (306) to point from the leaf node (302) to the local overflow node (304). The processor (102) copies (FIG. 6, block 608) the foster key (308) within the foster parent node (302) as a separator key (310) within the foster child node (304) so that the key value of the foster key (308) and the key value of the separator key (310) are equal. The processor (102) transfers (FIG. 6, block 610) a number of records contained within the foster parent node (302) to the foster child node (304).

In order to adopt the foster child node (304), the processor (102) moves (FIG. 6, block 612) the foster key (308) of the foster parent node (302) to the parent node (312). In this manner, a new separator key (314) within the parent node (312) is created that equals the value of the foster key (308). In the example of FIG. 5c, the separator key (314) has a key value of "100," and matches the new high fence key (318) of the foster parent node (302) and the low fence key (310) of the foster child node (304). The processor (102) moves (FIG. 6, block 614) the foster parent/foster child pointer (306) of FIG. 5b from the foster parent node (302) to the parent node (312) between the separator key (314) and the high fence key of the parent node (312). The foster parent/foster child pointer (306) thus forms the parent/child pointer (316), as depicted in FIG. 5c. In the case of FIGS. 5b and 5c, the next highest fence key of the parent node (312) has a key value of "150." The processor (102) deletes (FIG. 6, block 616) the high fence key (309) from the former foster parent node (302). In this manner, the former foster key (308) becomes the new high fence key (318) within the former foster parent node (302). In one example, the value of the foster key can be selected arbitrarily from within the range of values represented by the foster parent, and does not have to correspond to value of a pre-existing key.

In the case of FIGS. 5a through 5d, the parent node (312) may now have too many records, and may be split as well. The above process, therefore, is repeated with regard to any number of branch nodes including, for example, parent node (312). Thus, the method of FIG. 6 continues by determining (FIG. 6, block 618) whether an overflow of records exists in the parent node (312). If there is not an overflow of records within the parent node (312) (FIG. 6, block 618, determination NO), then no additional nodes are split, and the process terminates.

However, if there is an overflow of records within the parent node (312) (FIG. 6, block 618, determination YES), then the process returns to block 602. The processor (102) detects (FIG. 6, block 602) an overflow of records in a node such as the parent node (312) in FIG. 5c. Once detected (FIG. 6, block 602), the processor (102) initiates a split of the parent node (312), for example, by allocating (FIG. 6, block 604) a new local overflow node (504) of FIG. 5c within the Foster B-tree data structure (200). The processor (102) assigns (FIG. 6, block 606) a foster parent/foster child pointer (306) to point from the parent node (312) to the local overflow node (504) in FIG. 5c. The processor (102) copies (FIG. 6, block 608) the foster key (508) within the parent node (312) acting as a foster parent node as a separator key (510) within the local overflow node (504) acting as a foster child node so that the key value of the foster key (508) and the key value of the separator key (510) are equal. The processor (102) transfers (FIG. 6, block 610) a number of records contained within the parent node (312) to the local overflow node (504).

In order to adopt the foster child node (504), the processor (102) moves (FIG. 6, block 612) the foster key (508) of the parent node (312) to the parent node (512). In the example of FIGS. 5c and 5d, the parent node (512) is the root node (512). In this manner, a new separator key (514) within the root node (512) is created that equals the value of the foster key (508). The processor (102) moves (FIG. 6, block 614) the foster parent/foster child pointer (506) of FIG. 5c from the parent node (312) to the root node (512) between the separator key (514) and the next highest fence key of the root node (512) as depicted in FIG. 5d. In the case of FIGS. 5c and 5d, the next highest fence key of the root node (512) has an unbounded key value of +∞. In this manner, the root node (512) picks up an additional separator key (514). The processor (102) deletes (FIG. 6, block 616) the high fence key (509) from the former foster parent node (312). In this manner, the former foster key (508) becomes the new high fence key (518) within the former foster parent node (312).

Although only two iterations of the method of FIG. 6 is implemented within the Foster B-tree data structure (200) of FIGS. 5a through 5d, any number of iterations may be carried out by the processor (102) to propagate any number of node splits. Further, although the node split propagation of FIGS. 5a through 5d end with the splitting of a branch node immediately below the root node (512), the splitting of branch nodes may end before the branch node immediately below the root node (512).

As mentioned above, the Foster B-tree data structure (200) may remain in a non-steady state for any amount of time. This temporary non-steady state is depicted in FIGS. 5b and 5c. In one example, if the Foster B-tree data structure (200) remains in a non-steady state, there may exist a situation where more records are added to a foster child node (304, 504) that that foster child node (304, 504) overflows and a node split process is applied to a foster child node (304, 504). As can be seen in FIGS. 7a through 7d, the application of a node split operation on a foster child node (304, 504) creates a chain of foster child nodes.

Long chains of nodes are generally undesirable from a theoretical perspective because long chains destroy the guarantee for log(N) nodes along a root-to-leaf path. From a practical perspective, long chains can be avoided by resolving foster relationships as soon as possible by opportunity or by force. An opportunity arises if a root-to-leaf traversal encounters a foster parent and the thread is able to latch both parent node and child node (the foster parent) without delay. If the appropriate latches are not immediately available, a thread might wait, and, thus, force adoption of the foster child by the permanent parent.

Adoption can be side effect of read-only transactions, because the structural change in the Foster B-tree data structure (200) can be a separate transaction. Thus, any Foster B-tree data structure (200) traversal might perform adoption if the need and the opportunity arise. In another example, forcing adoption can be limited to insertion transactions, because insertion transactions make a chain longer.

FIGS. 7a through 7d are block diagrams of the various states of a Foster B-tree data structure (200) during a node split operation performed on a foster child node, according to one example of the principles described herein. FIG. 8 is a flow chart depicting a split operation performed on a foster child node within a Foster B-tree data structure (200), according to one example of the principles described herein. The method of node splitting on a foster child node begins by splitting a leaf node (302) as described in connection with FIGS. 3a through 3c and FIG. 4. The processor (102) detects (FIG. 8, block 802) an overflow of records in a node such as leaf node (302) in FIG. 8a. Once detected (FIG. 8, block 802), the processor (102) initiates a split of the leaf node (302), for example, by allocating (FIG. 8, block 804) a new local overflow node (304) of FIG. 8b within the Foster B-tree data structure (200). The processor (102) assigns (FIG. 8, block 806) a foster parent/foster child pointer (306) to point from the leaf node (302) to the local overflow node (304) in FIG. 7b. The processor (102) copies (FIG. 8, block 808) the foster key (308) within the foster parent node (302) as a separator key (310) within the foster child node (304) so that the key value of the foster key (308) and the key value of the separator key (310) are equal. The processor (102) transfers (FIG. 8, block 810) a number of records contained within the foster parent node (302) to the foster child node (304).

In the case of FIGS. 7a through 7d, the foster child node (304) may now have too many records, and may need to be split as well. The above process, therefore, is repeated with regard to any number of foster child node (304) including, for example, foster child node (304). Thus, the method of FIG. 8 continues by determining (FIG. 8, block 812) whether an overflow of records exists in foster child node (304). If there is not an overflow of records within the foster child node (304) (FIG. 8, block 812, determination NO), then no additional nodes are split, and the process terminates.

However, if there is an overflow of records within the foster child node (304) (FIG. 8, block 812, determination YES), then the processor (102) again detects (FIG. 8, block 802) an overflow of records in the foster child node (304) in FIG. 7c. Once detected (FIG. 8, block 814), the processor (102) initiates a split of the foster child node (304), for example, by allocating (FIG. 8, block 816) a new local overflow node (704) of FIG. 7c within the Foster B-tree data structure (200). Thus, the new local overflow node (704) is a foster child node of the foster child node (304). Further, in this case, the foster child node (304) acts as both a foster child node to leaf node (302) and as a foster parent node to foster child node (704). The processor (102) assigns (FIG. 8, block 818) a foster parent/foster child pointer (706) to point from the foster child node (304) to the foster child node (704) in FIG. 7b. The processor (102) copies (FIG. 8, block 820) the foster key (708) within the foster child node (304) as a separator key (710) within the foster child node (704) so that the key value of the foster key (708) and the key value of the separator key (710) are equal. The processor (102) transfers (FIG. 8, block 822) a number of records contained within the foster parent node (304) to the foster child node (704).

The process then loops back to block 812 to determine again if any of the foster child nodes created up to that point are overflowing with records. In this manner, any number of foster child nodes depending from another foster child node may be created. Thus, a chain of foster child nodes may be created within a Foster B-tree data structure (200).

Figure 7D:
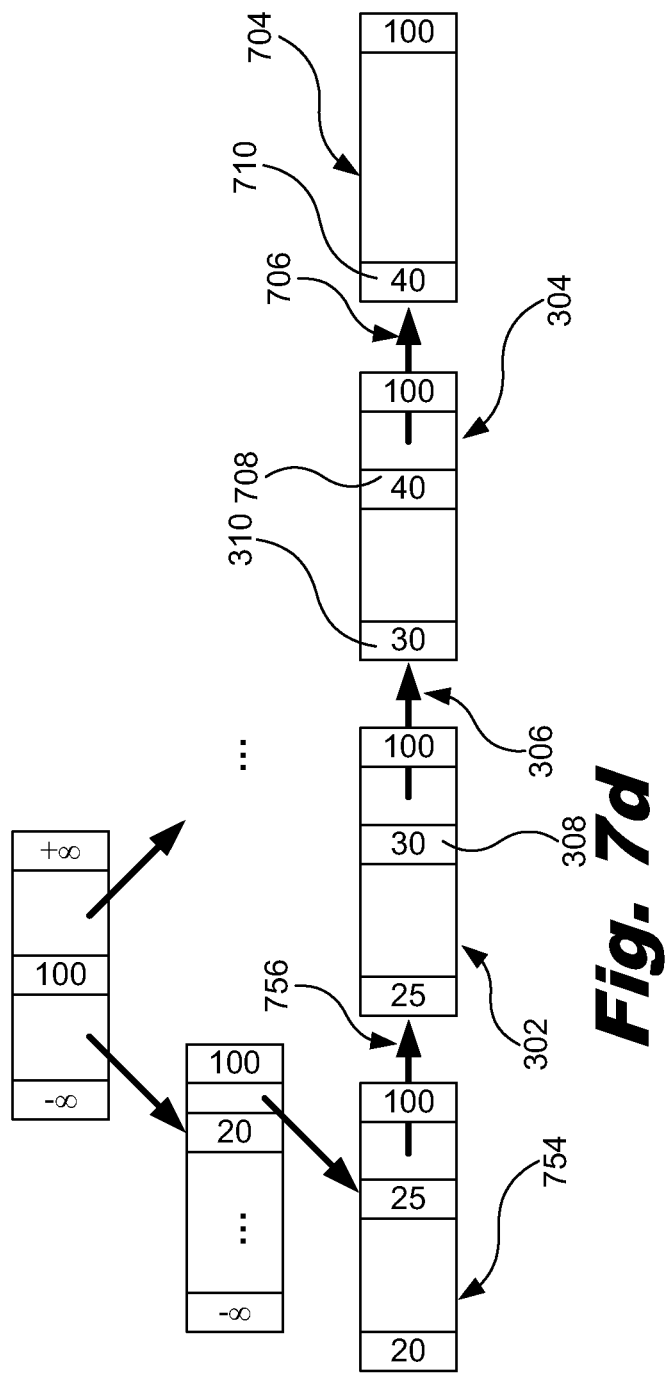
Figure 8:
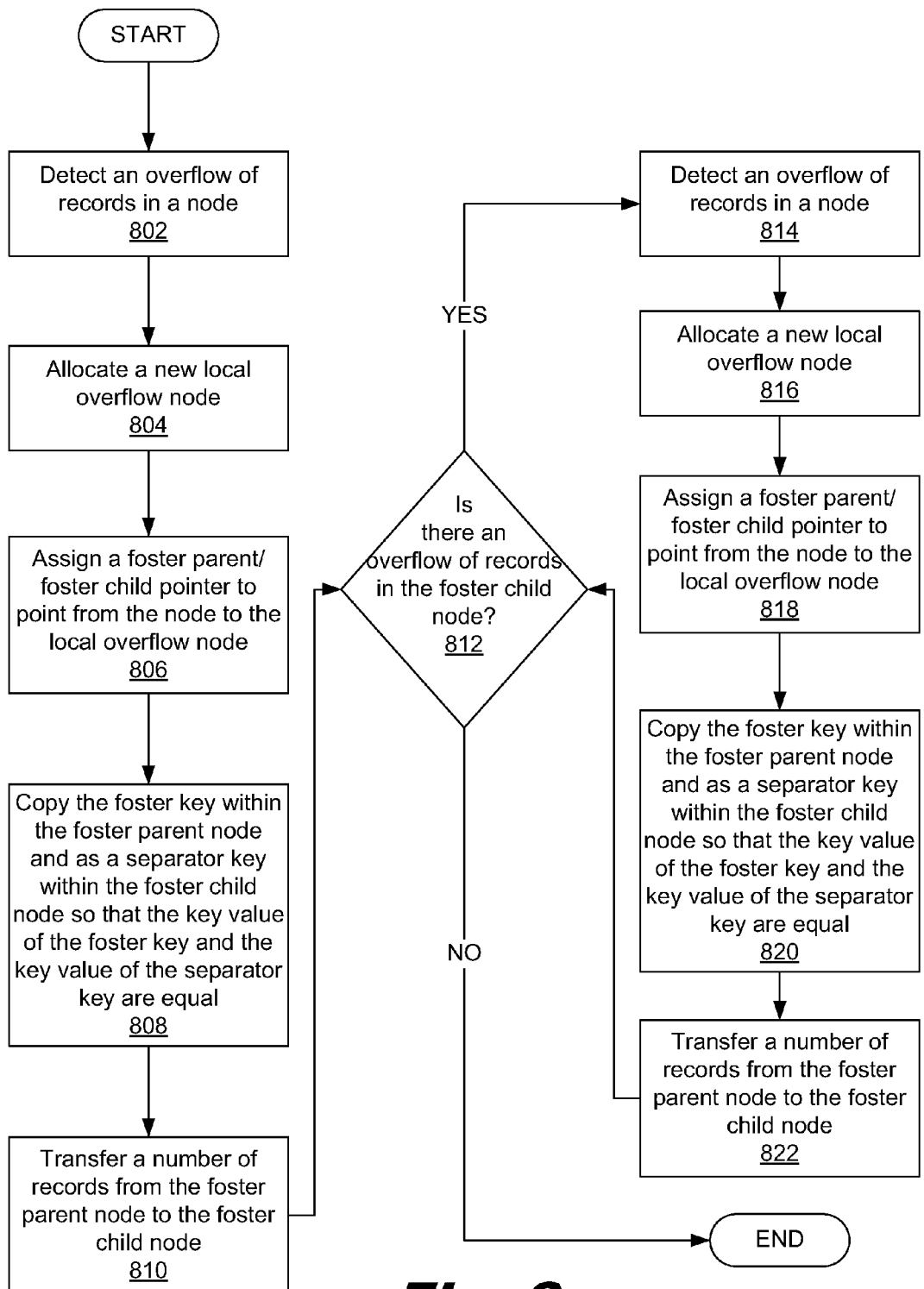
FIG. 8 is a flow chart depicting a split operation performed on a foster child node within a Foster B-tree data structure, according to one example of the principles described herein.

As depicted in FIG. 7d, first (304), second (704), and third (754) foster child nodes have been created in a chain. The foster parent node (302) of this chain of foster child nodes (304, 704, 754) has also changed. The key values within the foster parent node (302) range from "25" to "30" with a parent/foster child pointer (306) that points to the foster child node (304) with a range of key values from "30" to "40." Further, the foster child node (304) comprises a parent/foster child pointer (706) that points to the foster child node (704) with a range of key values from "40" to "100." Still further, the foster parent node (302) comprises key values that range from "25" to "30" with a parent/foster child pointer (756) that points from the foster parent node (754) with a range of key values from "20" to "25."

The difference between FIGS. 7c and 7d is that the foster parent node (302) comprises different key value ranges. The transition from FIG. 7c to FIG. 7d demonstrates an instance where the chain of foster parent node (302) and foster child nodes (304, 704, 754) grows to the left with the foster parent node (754) being the new ultimate foster parent node within the chain. In this case, the foster parent node (302) splits such that more records are added to the beginning of the foster parent node (302). However, a single incoming pointer is associated with each node, and a consistency check passes due to the proper assignment of keys throughout the foster parent node (754) and foster child nodes (302, 304, 704).

Figure 9B:
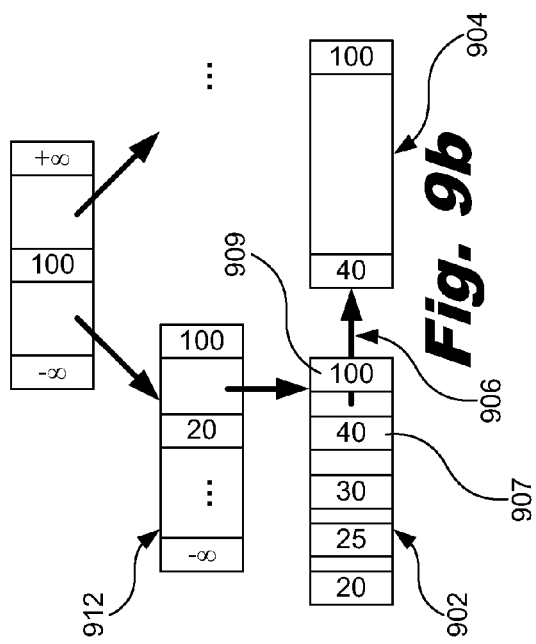
FIGS. 9a through 9d are block diagrams of the various states of a Foster B-tree data structure during a load balancing operation, according to one example of the principles described herein.
Figure 9D:
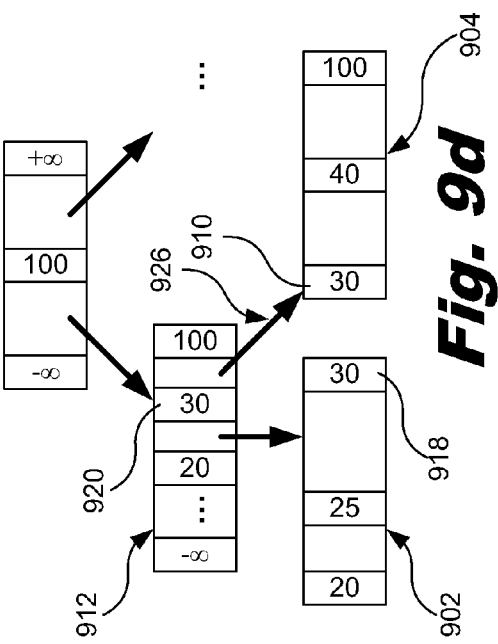

FIGS. 9a through 9d are block diagrams of the various states of a Foster B-tree data structure (200) during a load balancing operation, according to one example of the principles described herein. FIG. 10 is a flow chart depicting a load balancing operation within a Foster B-tree data structure (200), according to one example of the principles described herein. Load balancing among nodes of the same hierarchical level generally involves movement of records and adjustment of the key values in the parent node. As described above, a load balancing process within a Foster B-tree data structure (200) requires only two latches; a latch of the two nodes of the same hierarchical level whose records are being moved.

Figure 9A:
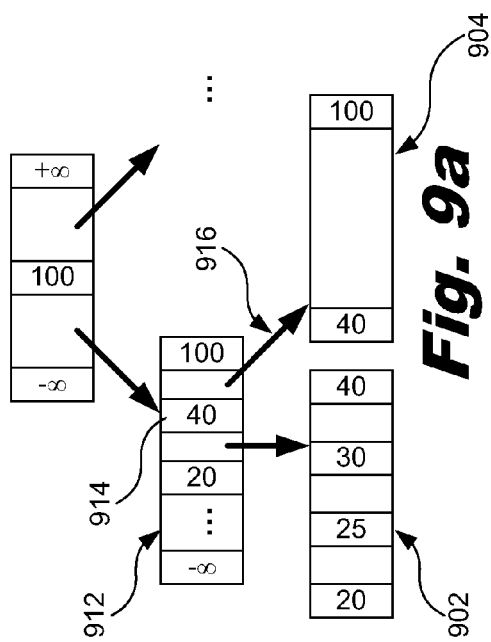
Figure 10:
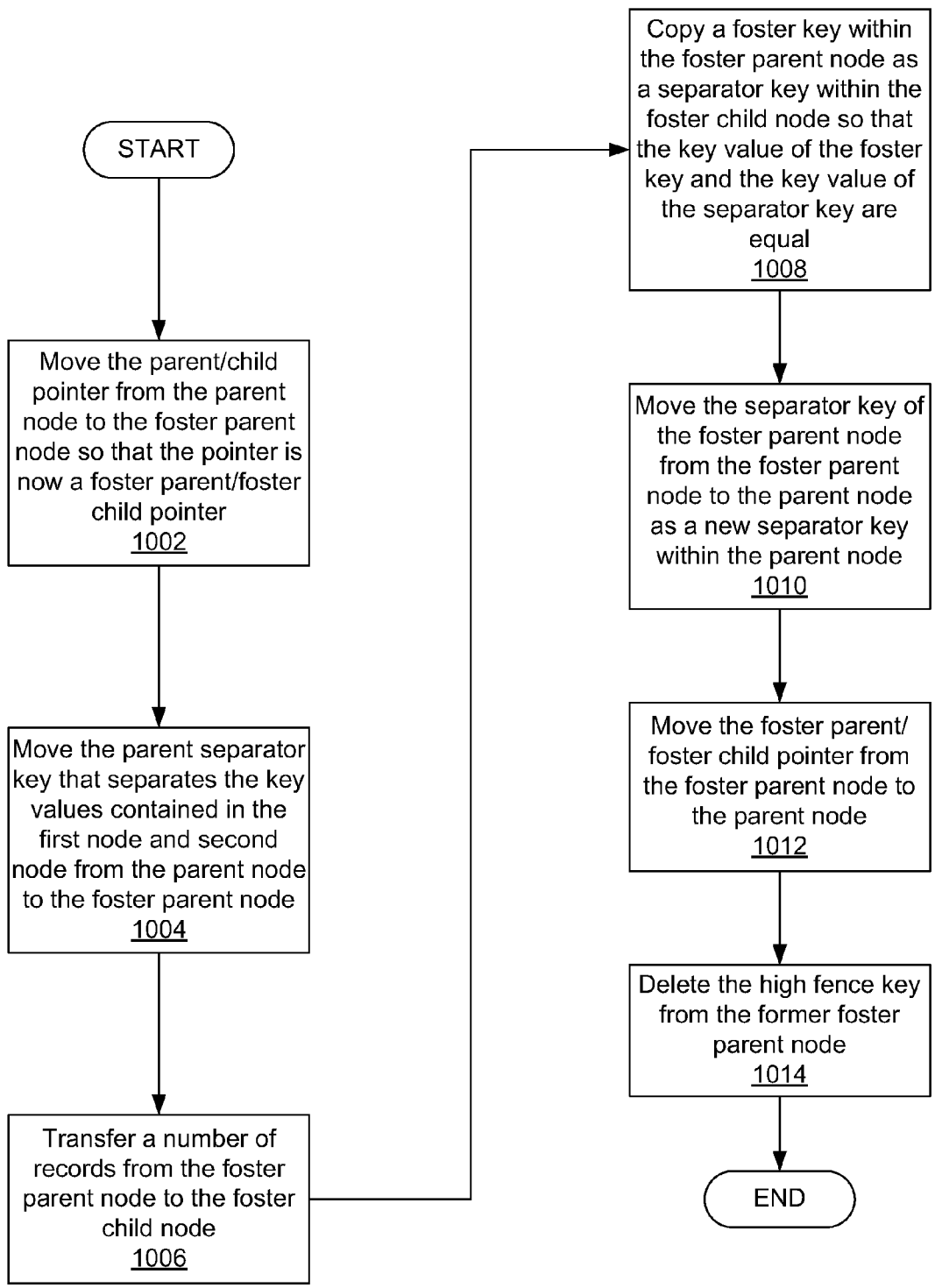
FIG. 10 is a flow chart depicting a load balancing operation within a Foster B-tree data structure, according to one example of the principles described herein.

In FIG. 9a, a first leaf node (902) has a disproportionately larger amount of records than a second leaf node (904). Thus, the method of load balancing begins by creating a foster parent/foster child relationship between two nodes of the same hierarchical level. This is achieved by the processor (102) moving (FIG. 10, block 1002) the parent/child pointer (916) from the parent node (912) to the foster parent node (902) so that the pointer is now a foster parent/foster child pointer (906). This is achieved by moving the pointer (916) from the parent node (912) to the foster parent node (902) between the separator key (907) and the high fence key (909) of the foster parent node (902). More specifically, the parent/child pointer (916) that points from the parent node (912) to the second leaf node (904) is moved to the first leaf node (302) so that the parent/child pointer (916) is now a foster parent/foster child pointer (906) that points from the newly designated foster parent node (902) to the newly designated foster child node (904). In this manner, the parent node (912) gives up control of the second leaf node (904).

Thus, the first (902) and second (904) leaf nodes become a foster parent node (902) and a foster child node (904), respectively, and form a foster parent/foster child relationship. In continuing with the analogy drawn from real-world foster parent and foster child custody scenarios, the parent node (912) abandons or relinquishes control over a child node. Thereafter, a foster parent//foster child relationship is formed between nodes of the same hierarchical level.

The processor (102) moves (FIG. 10, block 1004) the parent separator key (914) that separates the key values contained in the foster parent node (902) and foster child node (904) in FIG. 9a on the transition from FIGS. 9a to 9b from the parent node (912) to the foster parent node (302). Thus, in the example of FIGS. 9a and 9b, the parent separator key (914) with the key value of "40" is removed from the parent node (912) and moved to within the foster parent node (902) as the separator key (907).

Figure 9C:
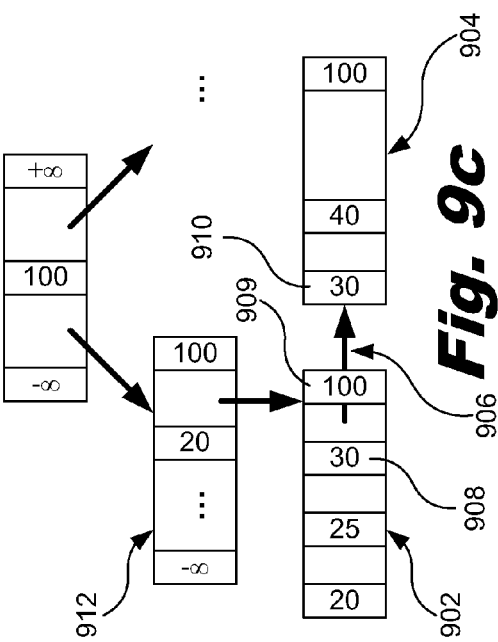

A number of records are then transferred (FIG. 10, block 1006) from the foster parent node (902) to the foster child node (904). In one example, the number of records transferred from the foster parent node (902) to the foster child node (904) is equal to half the sum of the records in the foster parent node (902) and the foster child node (904). In this manner, a substantially equal amount of records exist in the foster parent node (902) and the foster child node (904). In another example, a number of records may be transferred from the foster parent node (902) to the foster child node (904) such that a disproportionate number of records may exist in the foster parent node (902) and the foster child node (904). In the example of FIGS. 9b and 9c, records between "30" and "40" are transferred to the foster child node (904).

The processor (102) then copies (FIG. 10, block 1008) a foster key (908) within the foster parent node (902) as a separator key (910) within the foster child node (904) so that the key value of the foster key (908) and the key value of the separator key (910) are equal.

The process continues with the parent node (912) adopting the foster child node (904). This is accomplished by the processor (102) moving (FIG. 10, block 1010) the separator key (908) also designated as a foster key (908) of the foster parent node (902) from the foster parent node (902) to the parent node (912) as a new separator key (920) within the parent node (912) in FIG. 9d. The processor (102) moves (FIG. 10, block 1010) the foster parent/foster child pointer (906) from the foster parent node (902) to the parent node (912) as a parent child pointer (926) in the transition from FIG. 9c to FIG. 9d. The processor (102) deletes (FIG. 10, block 1014) the high fence key (909) from the former foster parent node (302). In this manner, the former foster key (908) becomes the new high fence key (918) within the former foster parent node (902). Thus, the Foster B-tree data structure (200) is returned to a steady state.

Thus, as can be seen in FIGS. 9a through 10, load balancing in a Foster B-tree data structure (200) is generally includes creating a foster parent/foster child relationship between two nodes of the same hierarchical level. The separator key (914) is removed from that child node's parent node and moved into the foster parent node (902). This movement of the separator key (914) can be accomplished with only two latches. Next, with only the two nodes (902, 904) of the same hierarchical level latched, records are moved and fence keys are adjusted. Next, with latches only on the parent node (912) and the foster parent node (902), pointer and page pointer are moved from the foster parent node (902) to the parent node (912).

Figure 12:
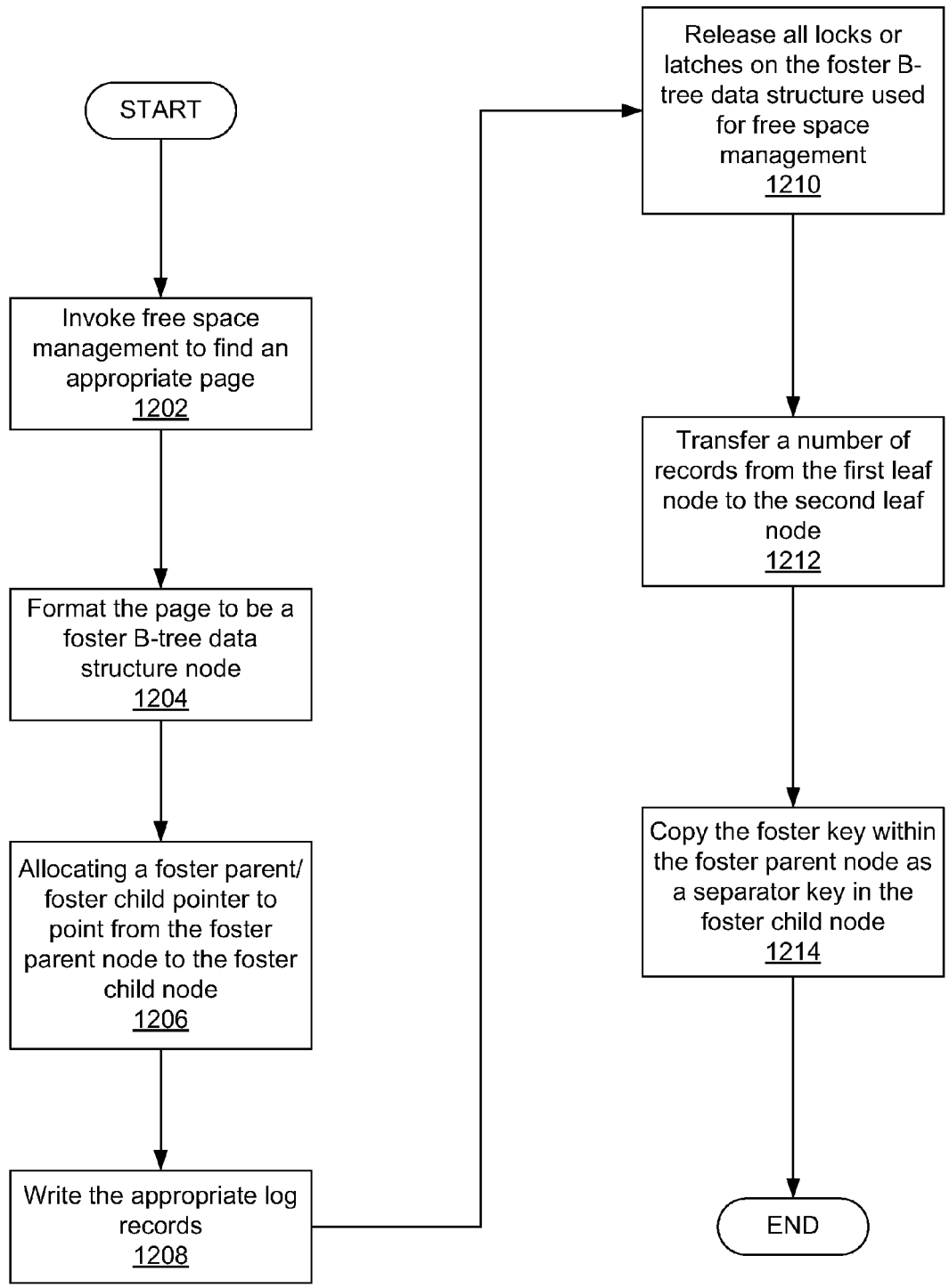
FIG. 12 is a flow chart depicting a leaf node allocation operation within a Foster B-tree data structure, according to one example of the principles described herein.

FIGS. 11a through 11c are block diagrams of the various states of a Foster B-tree data structure (200) during a load node allocation operation, according to one example of the principles described herein. FIG. 12 is a flow chart depicting a leaf node allocation operation within a Foster B-tree data structure (200), according to one example of the principles described herein. Node allocation operations entail that addition of a number of nodes within the Foster B-tree data structure (200). Generally, the processor (102) invokes free space management to find an appropriate page. The processor (102) then formats the page to be a Foster B-tree data structure node, links the new node to the foster parent, writes the appropriate log records, and releases all locks or latches on the data structures used for free space management.

In a preliminary state, the foster child remains empty except for two equal fence keys. Because one of the fence key values is exclusive, two equal fence key values imply an empty key range for the node. Thus, compression applies in that the two equal fence key values need not exist physically. This reduces space requirements in the foster parent and formatting effort in the foster child.

After allocation of the new node, the processor (102) performs a load balancing operation between the foster parent node and the foster child node. This operation determines a key value to separate the key ranges of foster parent node and foster child node, and it modifies the fence keys in both foster parent node and foster child node. Each state of the allocation operation can be a system transaction in that it is logged and recovered after a system failure but it can proceed in the same execution thread, relying on the latches of the user transaction in the same thread without locks and without forcing log buffers from memory to stable storage.

Specifically, an allocation operation may begin with the processor (102) invoking (FIG. 12, block 1202) free space management to find an appropriate page. The processor (102) then formats (FIG. 12, block 1204) the page to be a Foster B-tree data structure node (FIG. 11b, 1104). The processor (102) links the newly allocated node (1104), now a foster child node, to the foster parent node (1102) by allocating (FIG. 12, block 1206) a foster parent/foster child pointer (1106) to point from the foster parent node (1102) to the foster child node (1104). The processor (102) then writes (FIG. 12, block 1208) the appropriate log records, and releases (FIG. 12, block 1210) all locks or latches on the Foster B-tree data structure (200) used for free space management.

In the example of FIG. 11b, the foster child node (1104) has two equal fence key values of "100." As described above, equal fence key values imply an empty key range for the node. Therefore, the Foster B-tree data structure (200) will populate the foster child node (1104) with a number of records using a load balancing operation described above in connection with FIGS. 9a through 10. Specifically, the processor (102) transfers (FIG. 12, block 1212) a number of records from the foster parent node (1102) to the foster child node (1104).

The processor (102) then copies (FIG. 12, block 1214) a foster key (1108) within the foster parent node (1102) as a separator key (1110) within the foster child node (1104) so that the key value of the foster key (1108) and the key value of the separator key (1110) are equal. The process continues with the parent node (1112) adopting the foster child node (1104) as described above in connection with FIGS. 3a through 4.

Figure 14:
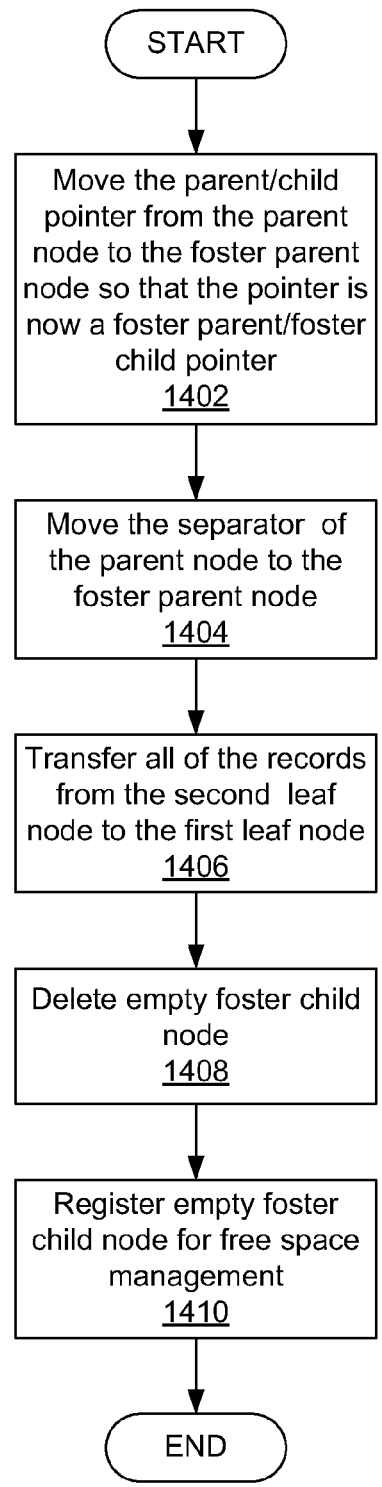
FIG. 14 is a flow chart depicting a leaf node deletion operation within a Foster B-tree data structure, according to one example of the principles described herein.

FIGS. 13a through 13d are block diagrams of the various states of a Foster B-tree data structure during a leaf node deletion operation, according to one example of the principles described herein. FIG. 14 is a flow chart depicting a leaf node deletion operation within a Foster B-tree data structure, according to one example of the principles described herein. Due to the invariant that, at all times, there is only a single incoming pointer per node within a Foster B-tree data structure (200), node deletion and page reclamation may be achieved. Generally, leaf node deletion is achieved by forming a foster parent/foster child relationship between two nodes at the same hierarchical level. Thereafter, a load balancing operation moves all the records from the foster child node to the foster parent node. If all the records within the foster child node can not fit within the foster parent node, then the deletion of the foster child node is not possible. After the load balancing operation, the foster child node is empty except for two equal fence keys. Thus, the empty node is removed from the Foster B-tree data structure (200) and registered for free space management.

Specifically, a leaf node deletion operation may begin with, as FIG. 13a depicts, a Foster B-tree data structure (200) in a steady state. The processor (102) links a second leaf node (1304), now a foster child node (1304), to a first leaf node (1302), now a foster parent node (1302) by moving (FIG. 14, block 1402) a parent/child pointer (1316) from the parent node (1312) to the foster parent node (1302) so that the pointer is now a foster parent/foster child pointer (1306). This is performed in the transition from FIG. 13a to FIG. 13b.

The processor (102) moves (FIG. 14, block 1404) the separator key (1314) of the parent node (1312) to the foster parent node (1302). In this manner, a new separator key (1308) designated as a foster key (1308) is created within the foster parent node (1302) that equals the value of the separator key (1314).

The processor (102) transfers (FIG. 14, block 1406) all of the records from the foster child node (1304) to the foster parent node (1302), thus, emptying the foster child node (1304) of all the records contained therein. In the example of FIG. 13c, the foster child node (1304) has two equal fence key values of "100." As described above, equal fence key values imply an empty key range for the node (1304). The processor (102) deletes (FIG. 14, block 1408) the empty foster child node (1304) from the Foster B-tree data structure (200), and registers (FIG. 14, block 1410) the pages associated with that deleted foster child node (1304) for free space management. The deletion and registering of the foster child node (1304) is completed in the transition from FIG. 3c to FIG. 3d. The Foster B-tree data structure (200) is, therefore, returned to a steady state in FIG. 13d.

In one example, deletion of a leaf node within the Foster B-tree data structure (200) may trigger underflow or too few records. In this example, this may lead to load balancing among branch nodes or deletion of a number of branch nodes. If, after deletion of a node, the root node has only a single child, and if that child is not a foster parent, then the root node can be removed from the Foster B-tree data structure (200), and will be replaced its former single child as will be described in more detail below. Thus, shrinking a Foster B-tree data structure (200) by a level requires very little logic, very little latching, and very little logging.

Figure 15A:
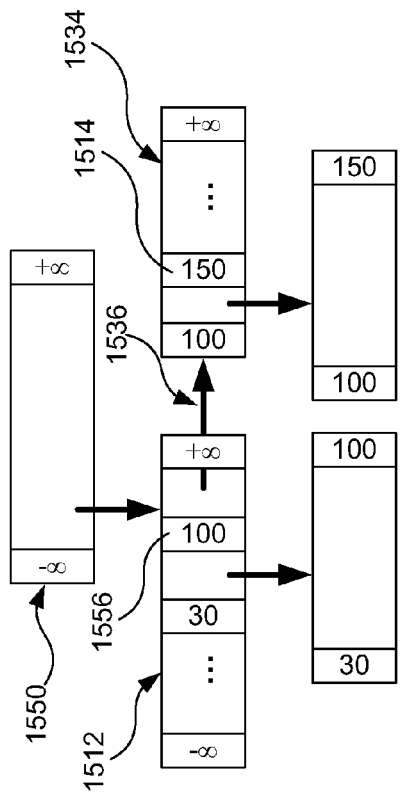
FIGS. 15a through 15e are block diagrams of the various states of a Foster B-tree data structure during a branch node deletion operation, according to one example of the principles described herein.
Figure 15B:
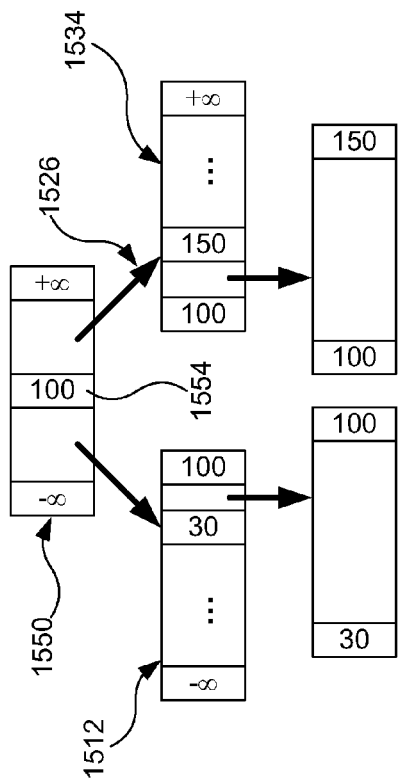
Figure 15C:
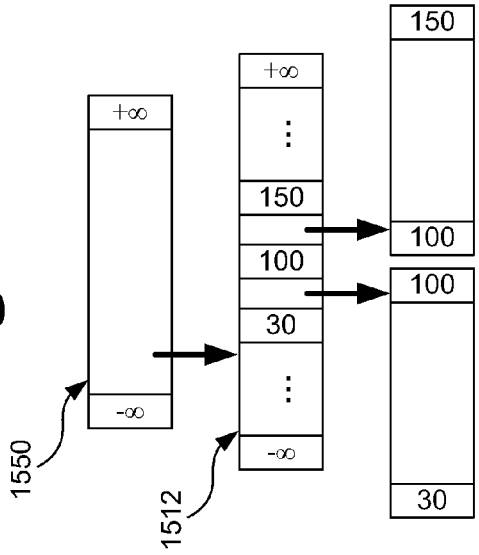

FIGS. 15a through 15e are block diagrams of the various states of a Foster B-tree data structure during a branch node deletion operation, according to one example of the principles described herein. FIG. 16 is a flow chart depicting a branch node deletion operation within a Foster B-tree data structure, according to one example of the principles described herein. The deletion of a branch node generally follows the deletion of a leaf node. In the example of FIG. 15a, a first branch node (1512) and a second branch node (1534) are underflowing or have too few records. In this situation, one of the two branch nodes (1512, 1534) should be deleted.

Specifically, a branch node deletion operation may begin with, as FIG. 15a depicts, a Foster B-tree data structure (200) in a steady state. The processor (102) links the a second branch node (1534), now a foster child node (1534), to the first branch node (1512), now a foster parent node (1512) by moving (FIG. 16, block 1602) a parent/child pointer (1526) from the parent node (1550) (i.e., the root node (1550)) to the foster parent node (1512) so that the pointer is now a foster parent/foster child pointer (1536) to point from the foster parent node (1512) to the foster child node (1534) as depicted in FIG. 15b.

The processor (102) moves (FIG. 16, block 1604) the separator key (1554) of the root node (1512) to the foster parent node (1512). In this manner, a new separator key (1556) designated as a foster key (1556) is created within the foster parent node (1512) that equals the value of the separator key (1554). The processor (102) transfers (FIG. 16, block 1606) all of the records from the foster child node (1534) to the foster parent node (1512), thus, emptying the foster child node (1534) of all the records contained therein. In the example of FIG. 15c, the foster child node (1534) has two equal fence key values of and "+∞." As described above, equal fence key values imply an empty key range for the node (1534). Also, as depicted in FIGS. 15b and 15c, the processor (102) transfers (FIG. 16, block 1608) a separator key (1514) from the foster child node (1534) to the foster parent node (1512), and allocates (FIG. 16, block 1610) a parent/child pointer (1516) between the foster parent node (1512) and the child node (1522) that previously depended from the foster child node (1534).

The processor (102) deletes (FIG. 16, block 1612) the empty foster child node (1534) from the Foster B-tree data structure (200), and registers (FIG. 16, block 1614) the pages associated with that deleted foster child node (1534) for free space management. The deletion and registering of the foster child node (1304) is completed in the transition from FIG. 3c to FIG. 3d. The Foster B-tree data structure (200) is, therefore, returned to a steady state in FIG. 13d.

Figure 15D:
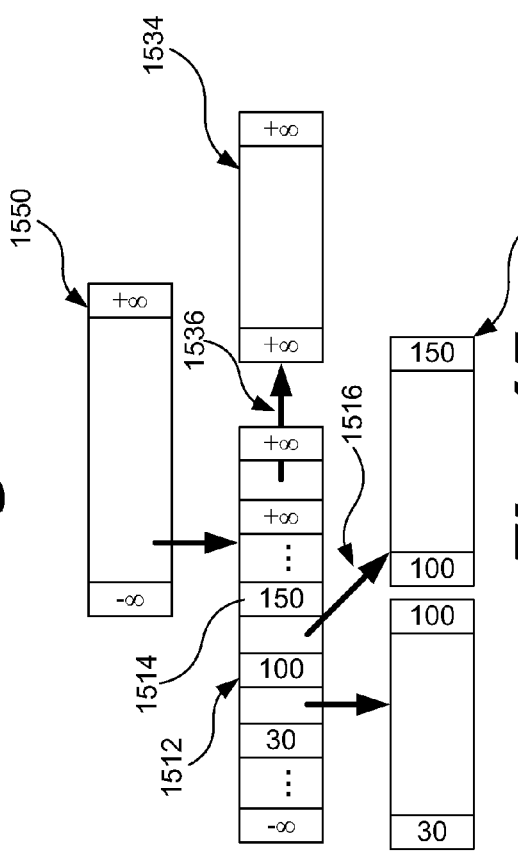
Figure 15E:
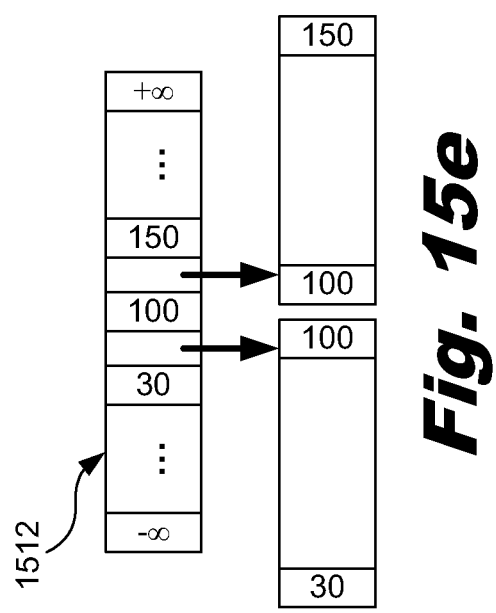
Figure 16:
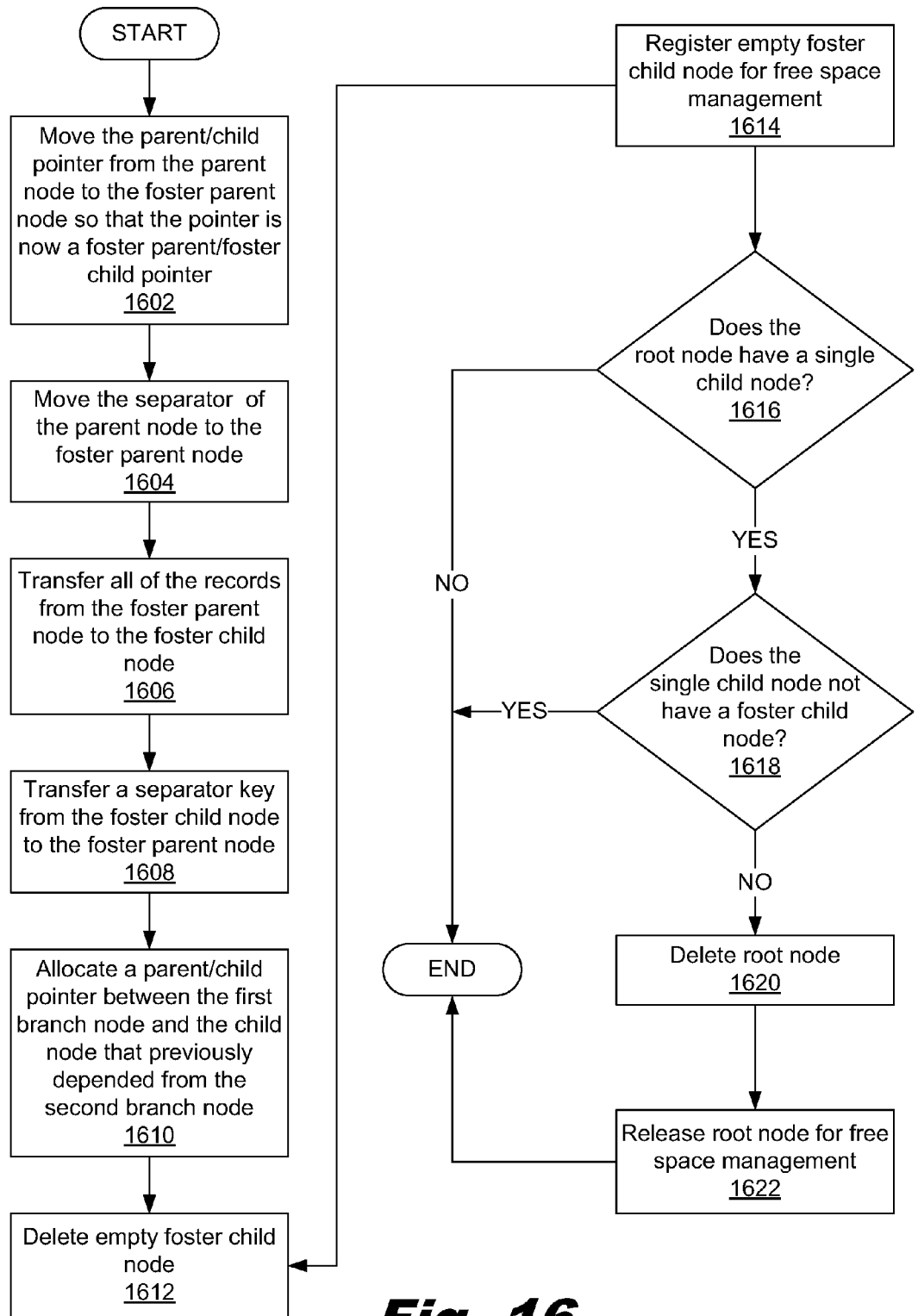
FIG. 16 is a flow chart depicting a branch node deletion operation within a Foster B-tree data structure, according to one example of the principles described herein.

As depicted in FIG. 15d, the deletion of the foster child node (1534) brought about a situation where the root node (1550) has only a single child node; branch node (1512). Thus, the processor (102) may determine (FIG. 16, block 1616) whether the root node (1550) has a single child node. If the root node does not have a single child node (FIG. 16, block 1616, determination NO), then the process terminates. However, if the root node does have a single child node (FIG. 16, block 1616, determination YES), the processor determines whether the single child node has a foster child node (FIG. 16, block 1618).

If the single child node does have a foster child node (FIG. 16, block 1618, determination YES), then the process terminates, or, as described above, the processor performs an adoption operation where the foster child node is adopted by the root node (1550). However, if, as in the case of FIG. 15d, the single child node does not have a foster child node (FIG. 16, block 1618, determination NO), then the processor (102) deletes (FIG. 16, block 1620) the root node (1550), and releases (FIG. 16, block 1622) the root node (1550) for free space management. In this manner, the branch node (1512) becomes the new root node as depicted in the transition from FIGS. 15d to 15e, and the Foster B-tree data structure (200) shrinks by one hierarchical level.

Figure 18:
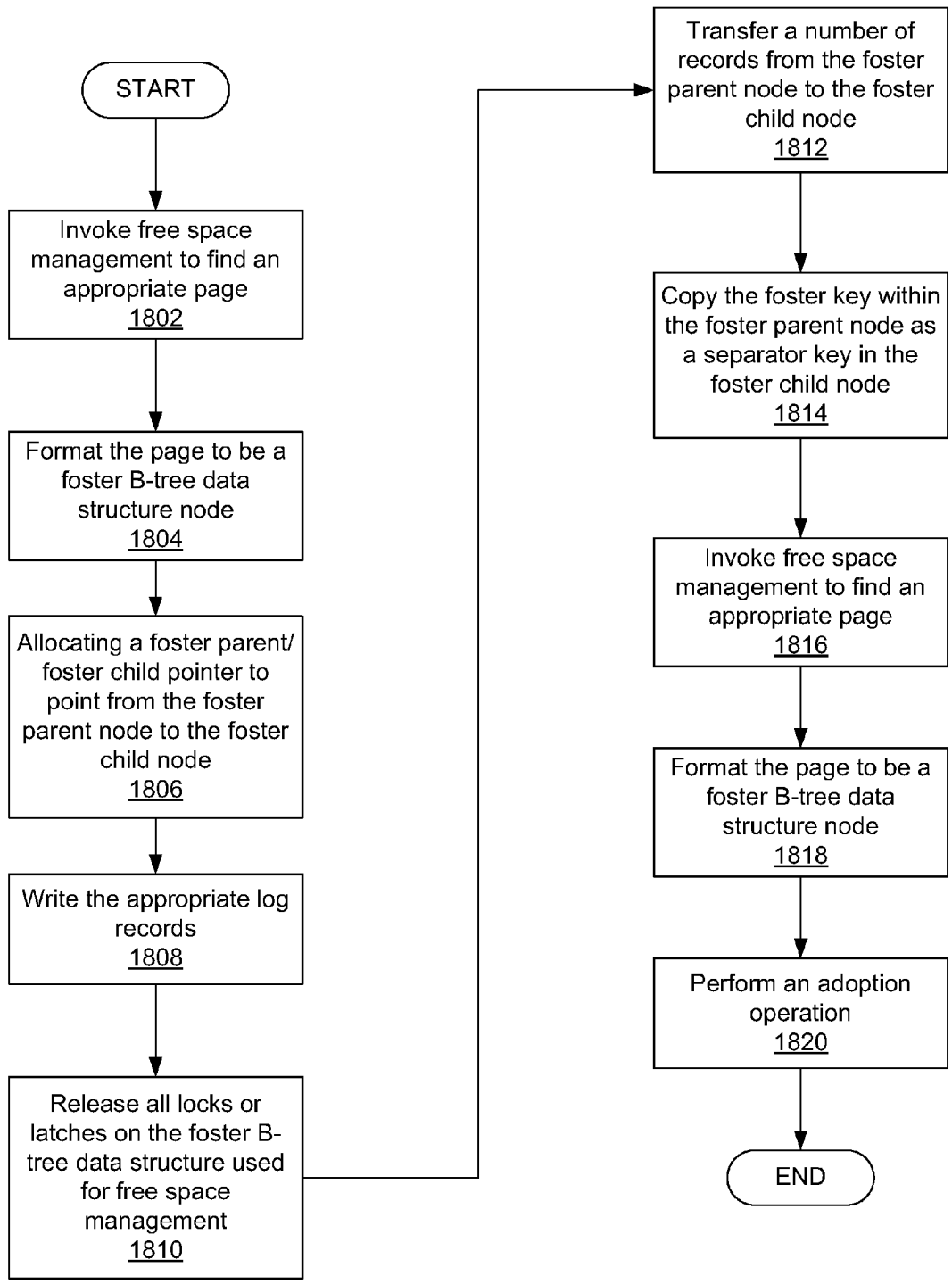
FIG. 18 is a flow chart depicting a tree growth operation within a Foster B-tree data structure, according to one example of the principles described herein.

FIGS. 17a through 17e are block diagrams of the various states of a Foster B-tree data structure during a tree growth operation, according to one example of the principles described herein. FIG. 18 is a flow chart depicting a tree growth operation within a Foster B-tree data structure, according to one example of the principles described herein. In a situation where a root node becomes a foster parent, a new root node is created, and the Foster B-tree data structure (200) grows by one level.

A tree growth operation may begin with, as FIG. 17a depicts, a Foster B-tree data structure (200) in a steady state. In the situation of FIG. 17a, the root node (1750) is overflowing with records. The processor (102) begins the tree growth operation by invoking (FIG. 18, block 1802) free space management to find an appropriate page. The processor (102) then formats (FIG. 18, block 1804) the page to be a Foster B-tree data structure node (FIG. 17b, 1704). The processor (102) links the newly allocated node (1704), now a foster child node (1704), to the foster parent node (1750) by allocating (FIG. 18, block 1806) a foster parent/foster child pointer (1706) to point from the foster parent node (1750) to the foster child node (1704). The processor (102) then writes (FIG. 18, block 1808) the appropriate log records, and releases (FIG. 18, block 1810) all locks or latches on the Foster B-tree data structure (200) used for free space management.

In the example of FIG. 17b, the foster child node (1704) has two equal fence key values of "+∞." As described above, equal fence key values imply an empty key range for the node. Therefore, the processor (102) will populate the foster child node (1704) with a number of records using a load balancing operation described above in connection with FIGS. 9a through 10. Specifically, the processor (102) transfers (FIG. 18, block 1812) a number of records from the foster parent node (1750) to the foster child node (1704).

The processor (102) then copies (FIG. 18, block 1814) a foster key (1708) within the foster parent node (1750) as a separator key (1710) within the foster child node (1704). In the preliminary state depicted in FIG. 17c, the Foster B-tree data structure (200) is without a root node because the root node (1750) has now been repurposed as a foster parent node. Therefore, the processor (102) invokes (FIG. 18, block 1816) free space management to find an appropriate page for the new root node. The processor (102) then formats (FIG. 18, block 1818) the page to be a Foster B-tree data structure node (FIG. 17b, 1704). Thus, the new root node (1755) is allocated within the Foster B-tree data structure (200) as depicted in FIG. 17d.

However, as depicted in FIG. 17d, the root node (1755) does not have a separator key, and only points to the foster parent node (1750). Therefore, the processor (102) performs (FIG. 18, block 1820) an adoption operation as described above in connection with FIG. 3c in order to adopt the foster child node (1704). Thus, in this manner, the Foster B-tree data structure (200) returns to a steady state as depicted in FIG. 17e.

The methods described above may be accomplished in conjunction with a computer program product comprising a computer readable medium having computer usable program code embodied therewith that, when executed by a processor, performs the above processes and methods. Specifically, the computer usable program code, when executed by a processor, maintain one incoming pointer for each node in the tree data structure, create a first local overflow node at the same hierarchical level within the tree data structure as a sibling node, assign a foster parent/foster child pointer to point from the sibling node to the first local overflow node, the sibling node and first local overflow node forming a foster parent/foster child relationship, the sibling node being a foster parent node and the first local overflow node being a foster child node, copy a foster key within the foster parent node as a separator key within the foster child node, transfer a number of records from the foster parent node to the foster child node, move the foster key from the foster parent node to a parent node of the foster parent node, move the foster parent/foster child pointer from the foster parent node to the parent node of the foster parent node, and maintain a pair of fence keys for each node in the tree data structure.

As demonstrated throughout the above examples, system transactions in a Foster B-tree data structure (200) increase and shrink the tree height with a minimal physical change and with a minimal number of latches (e.g., two latches). When a transaction finds that the root node has a foster child node, the tree height is increased. Then, the transaction invokes a system transaction to upgrade the latch on the current root node and make an exact copy of it which becomes the only child of the root node. After this, the root node has only the single child and the two fence keys; ±∞. Adopting foster-children of the former-root node is done asynchronously and opportunistically.

This procedure guarantees the system transaction that increases the tree height touches only two nodes, and thus requires only a minimal number of latches for a very short duration of time. Should a transaction find that the root node has only one child and no foster-child, the system transaction will, instead, shrink the height of the tree, replacing the root node with the only child node.

System transactions are very efficient. They do not require a separate thread or a flushing of the recovery log to stabilize storage during commit. System transactions with only a single log record do not even require a transaction identifier or a transaction object in memory. They do not acquire locks, because those protect logical database contents whereas system transactions affect the representation but not logical contents. They do, however, log their changes.

Foster B-tree data structures rely on "crabbing" or latch coupling when navigating from node to node in a root-to-leaf pass. Retrieval operations latch all nodes along the path in shared mode. Update operations latch branch nodes in shared mode and the appropriate leaf node in exclusive mode. If an update requires changing the B-tree structure, shared latches are upgraded to exclusive latches as appropriate.

System transactions perform not only structural updates but also all other updates that modify the logical contents of the database or the index. This includes, in particular, removal of pseudo-deleted, "ghost" records and their creation. In fact, one of the design principles of a Foster B-tree data structure (200) is that user transactions only modify existing structures whereas system transactions allocate, create, remove, and free all structures.

Ghost records are used for efficient deletion of records in leaf nodes. Each record contains one bit to mark a record as valid or as a ghost. A logical deletion marks a record as invalid or as a ghost. A transaction rollback reverses this update. A subsequent logical insertion by the same or another transaction also reverses the bit to turn the ghost bit into a valid record. While ghost records participate in key range locking, each query or scan includes an implicit predicate to filter out ghost records.

In Foster B-tree data structures (200), ghost records are also used during insertion of new key values into an index. First, a system transaction creates a ghost with the desired key value. This ghost record is committed and remains in the leaf page if the user transaction eventually rolls back. Second, the user transaction updates the ghost record, turning it into a valid record and filling in the non-key fields.

Using system transactions for all representation changes, even two and sometimes three system transactions for structural changes, increases the logging requirements. Therefore, some logging optimizations may be made from the start and added some during the tuning effort.

When moving records between pages, such as, for example, when splitting a node, a Foster B-tree data structure (200) relies on careful write ordering. For example, the original source page on the storage device serves as backup until the updated destination page has been written to the storage device. For many system transactions, a single log record can suffice. This is called fusing log records. This is advantageous for ghost creation and ghost removal, because those system transactions affect only a single page.

A single log record per system transaction offers multiple advantages. Since the commit is included in the log record, no "undo" information is required. In addition, there is no need to allocate a transaction identifier or to form a linked list of log record. In other words, both transaction identifier and prior log sequence numbers (LSNs) are not required in the log record. Omitting these fields substantially shrinks the log record header and thus the log record.

Even with a single log record per system transaction, contention for the log buffer may exist because each logical insertion latches the tail of the log twice; once for the system transaction creating the ghost record, and once for the user transaction turning the ghost into a valid record. A system transaction merely appends its single log record to the private log buffer. The user transactions appends its own log record to the log buffer and then applies both log records after appending the entire private log buffer to the global log buffer. The "redo" logic is invoked for this purpose, which already shares most of its code with normal forward processing ("do") code. Note that this technique only applies if the appropriate data pages remain latched during the entire process.

In a Foster B-tree data structure (200), each node is referenced by a single pointer only, at all times. Usually, the pointer is part of the parent nodes; temporarily, the pointer may be found in a sibling at the same hierarchical level of the Foster B-tree data structure (200). This sibling acts in loco parentis (i.e., as foster parent). A foster child might also be a foster parent; in this case, there is a chain of foster relationships. In addition, a Foster B-tree data structure (200) utilizes fence keys primarily for immediate and exhaustive consistency checks.

For efficient transactional behavior, Foster B-tree data structure (200) rely on system transactions for representation changes, with user transactions merely updating but never creating or removing structures such nodes or key values in leaf nodes. Multiple logging optimizations are easily possible for an efficient and competitive implementation.

As long as there are no foster relationships in the Foster B-tree data structure (200), verification as side effect of query processing is no different in Foster B-tree data structure (200) with respect to other tree data structures. In a foster relationship, the foster parent carries not only a pointer to the foster child but also the high fence key of the foster child and any foster children it may have. Thus, a foster parent enables the same level of verification as a natural parent node.

This idea extends not only to children but also to cousin nodes. The separator key in an ancestor node (e.g., a grandparent of leaf nodes) is carried as the high fence key in the left child. If that child is a foster parent, the key value is carried further to the foster child and, if that foster child is a foster parent in its own right, down the chain of foster relationships. Tests are then carried down to the next level of the Foster B-tree data structure (200), along the seam defined by the separator key in the ancestor node.

A root-to-leaf pass from the parent to the foster parent carries key values that match the key values in the child. That is, the foster parent, as the low fence key of the node and the high fence key of the foster chain. The traversal from foster parent to foster child carries the new separator key value and the high fence key value of the chain. If there is a chain of foster relationships, the traversal repeated uses the chain's high fence key for verification.

In addition to local verification along a single root-to-leaf path, Foster B-tree data structure (200) can easily verify all invariants within a key range. One partition with value "0" in the artificial leading key field might be a read-only partition, filled to 100% and with all records carefully compressed, whereas another partition might be used like a differential file with many updates. A regional verification may focus on the latter partition only, defined by the key value in the artificial leading key field. The principal method of operation within a regional verification is an in-order traversal of the data structure together with local verification as described above.

A possible verification strategy for an entire Foster B-tree data structure (200) is to define the entire key domain as a region to verify. For very large indexes, however, this is not the most efficient strategy. Moreover, the technique does not apply to backup tapes, recovery data, and replication streams, among others.

If an entire Foster B-tree data structure (200) or even a set of Foster B-tree data structures (200) requires verification, a disk-order scan provides the pages with the highest bandwidth but not in key value order. For those situations, a strategy similar to bit vector filtering can be employed. When a child page is encountered, facts relevant to the child's relationship to its parent are hashed and an appropriate bit in the bit vector is toggled. These facts include index identifier, level (above the leaves), page identifier, low fence key, and high fence key. When a parent page is encountered, the same facts are hashed for each child page and the appropriate bit is toggled. At the end of the procedure, the bit vector must be in its original state. If it is not, some facts did not match up and the Foster B-tree data structure (200) must contain an inconsistency. If the bit vector is of sufficient size, the probability of a false impression of correctness is negligible.

TABLE 1

Adoption Policies

| Policy | Try While INSERT | Try While SELECT | Force When Starved |
|---|---|---|---|
| None | No | No | No |
| Opp-I | Yes | No | No |
| Opp-B | Yes | Yes | No |
| E-Opp | Yes | Yes | Yes |

Table 1, above, lists four adoption policies evaluated in the Foster B-tree data structure (200) implementation. (None) never adopt, meaning that all foster parent relationships persist for the duration of the experiment; (Opp-I) opportunistically attempt to adopt on insert, which means that every insert operation will try to resolve foster relationships through adoption, but will immediately give up if it fails to obtain an exclusive latch; (Opp-B) same as Opp-I except it attempts to adopt on both insert and select; (EOpp) Eager-Opportunistic hybrid adoption, which will also try to resolve foster relationships through opportunistic adoption, but aggressively force exclusive latches and then adopt when it encounters repeated failures because of high contention.

Opportunistic adoption policies are effective when resolving foster chains. The advantage of opportunistic adoption policies is that they promise to impact latch contention only minimally by only resolving foster parent relationships if latches are readily available. However, foster parent relationships themselves result from latch contention, which raises the question of how effective are opportunistic adoption policies when latch contention is rife due to high-skew in the queried keys.

The specification and figures describe a method of implementing a tree data structure. The method comprises with a processor and in the data tree structure comprising a number nodes, creating a parent and child relationship between a first node and a second node, in which the first node and second node are at the same hierarchical level of the tree data structure, the first node being a foster parent node and the second node being a foster child node, and maintaining only one incoming pointer for each of the nodes in the tree data structure at all times, in which the parent and child relationship created between the first node and the second node does not involve a node in a higher hierarchical level of the tree data structure This method of implementing a tree data structure may have a number of advantages, including: (1) consistency checking among the nodes within the tree data structure; (2) the need for only two latches to the foster parent node and the foster child node before, during, and after making a structural change to the tree data structure; and (3) ease of page movement due to a single pointer for every node at all times, among others.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of implementing a tree data structure comprising:
   with a processor:
      in the data tree structure comprising a number nodes, creating a parent and child relationship between a first node and a second node, in which the first node and second node are at the same hierarchical level of the tree data structure, the first node being a foster parent node and the second node being a foster child node; and
      maintaining only one incoming pointer for each of the nodes in the tree data structure at all times;
      in which the parent and child relationship created between the first node and the second node does not involve a node in a higher hierarchical level of the tree data structure.

2. The method of claim 1, in which maintaining only one incoming pointer for each of the nodes in the tree data structure at all times comprises maintaining only one incoming pointer for each of the nodes in the tree data structure before, during, and after making a structural change to the tree data structure.

3. The method of claim 1, further comprising:
   moving, with the processor, a foster key of the foster parent node to a parent node of the foster parent node; and
   moving, with the processor, a foster parent/foster child pointer from the foster parent node to the parent node.

4. The method of claim 3, in which the foster child node is adopted as a child node of the parent node of the foster parent node if a root-to-leaf traversal encounters a foster parent, and if the thread is able to latch both parent node and the foster parent without delay.

5. The method of claim 1, further comprising assigning, with the processor, a separator key to the first node, in which the separator key is copied from a parent node of the first node.

6. The method of claim 5, further comprising assigning at least three keys to the foster parent node,
   in which the three keys comprise two fence keys that match key values of a parent node of the foster parent node and the separator key,
   in which the separator key matches a low fence key of the foster child node.

7. The method of claim 1, in which the parent and child relationship created between the foster parent node and the foster child node comprises locking only two nodes, in which the two nodes comprise the foster parent node and the foster child node.

8. A tree data structure comprising:
   a database that stores a number of records in a number of nodes of the tree data structure; and
   a processor that performs a number of functions associated with the records and nodes of the tree data structure;
   in which each node in the tree data structure has a single incoming pointer, and
   in which the tree data structure comprises a pointer directed to a local overflow node from a node at the same hierarchical level as the local overflow node.

9. The tree data structure of claim 8, in which each node in the tree data structure comprises a pair of fence keys.

10. The tree data structure of claim 8, further comprising only said single incoming pointer for each of the nodes in the tree data structure existing before, during, and after making a structural change to the tree data structure.

11. The tree data structure of claim 8, further comprising a parent/child relationship established between the local overflow node as a foster child node and the node at the same hierarchical level as a foster parent node.

12. The tree data structure of claim 11, further comprising a foster parent/foster child pointer to point from the foster parent node to the foster child node.

13. The tree data structure of claim 12, further comprising a foster key of the foster parent node shared with a parent node of the foster parent node;
  wherein the foster parent/foster child pointer is shared from the foster parent node to the parent node.

14. The tree data structure of claim 11, further comprising at least three keys in the foster parent node,
  in which the three keys comprise two fence keys that match key values of a parent node of the foster parent node and a separator key,
  in which the separator key matches a low fence key of the foster child node.

15. A computer program product for implementing a tree data structure, the computer program product comprising:
  a non-transitory computer readable storage medium comprising computer usable program code embodied therewith, the computer usable program code comprising:
    computer usable program code to, when executed by a processor maintain one incoming pointer for each node in the tree data structure;
    computer usable program code to, when executed by a processor, create a first local overflow node at the same hierarchical level within the tree data structure as a sibling node;
    computer usable program code to, when executed by a processor, assign a foster parent/foster child pointer to point from the sibling node to the first local overflow node, the sibling node and first local overflow node forming a foster parent/foster child relationship, the sibling node being a foster parent node and the first local overflow node being a foster child node; and
    computer usable program code to, when executed by a processor, copy a foster key within the foster parent node as a separator key within the foster child node.

16. The computer program product of claim 15, further comprising computer usable program code to, when executed by a processor, transfer a number of records from the foster parent node to the foster child node.

17. The computer program product of claim 16, further comprising computer usable program code to, when executed by a processor, maintain a pair of fence keys for each node in the tree data structure.

18. The computer program product of claim 15, further comprising:
  computer usable program code to, when executed by a processor, move the foster key from the foster parent node to a parent node of the foster parent node; and
  move the foster parent/foster child pointer from the foster parent node to the parent node of the foster parent node.

19. The computer program product of claim 18, further comprising:
  computer usable program code to, when executed by a processor, determines if there is an overflow of records in the parent node; and
  computer usable program code to, when executed by a processor, if there is an overflow of records in the parent node, create a second local overflow node at the same hierarchical level within the tree data structure as the parent node;
  computer usable program code to, when executed by a processor, assign a foster parent/foster child pointer to point from the parent node to the second local overflow node, the parent node and second local overflow node forming a foster parent/foster child relationship, the parent node being a foster parent node and the second local overflow node being a foster child node; and
  computer usable program code to, when executed by a processor, copy a foster key within the foster parent node as a separator key within the foster child node.

20. The computer program product of claim 15, further comprising:
  computer usable program code to, when executed by a processor, determines if a root node has a single child node;
  computer usable program code to, when executed by a processor, if the root node does have a single child node, determines if the single child node is a foster parent node of a foster child node; and
  computer usable program code to, when executed by a processor, delete the root node if the single child node is not a foster parent node of a foster child node.

* * * * *